United States Patent [19]
Puzak et al.

[11] Patent Number: 5,790,823
[45] Date of Patent: Aug. 4, 1998

[54] OPERAND PREFETCH TABLE

[75] Inventors: Thomas Roberts Puzak, Ridgefield, Conn.; Harold Stuart Stone, Princeton, N.J.

[73] Assignee: International Business Machines Corporation, Armonk, N.Y.

[21] Appl. No.: 502,115

[22] Filed: Jul. 13, 1995

[51] Int. Cl.$^6$ ........................ G06F 9/30
[52] U.S. Cl. ........................ 395/383
[58] Field of Search ............ 395/446, 383, 395/452

[56] References Cited

U.S. PATENT DOCUMENTS

| | | | |
|---|---|---|---|
| 3,898,624 | 8/1975 | Tobias | 340/172.5 |
| 4,502,110 | 2/1985 | Saito | 395/450 |
| 4,551,799 | 11/1985 | Ryan et al. | 395/467 |
| 4,774,654 | 9/1988 | Pomerene et al. | 364/200 R |
| 4,807,110 | 2/1989 | Pomerene et al. | 364/200 |
| 5,093,777 | 3/1992 | Ryan | 395/400 |
| 5,305,389 | 4/1994 | Palmer | 382/1 |
| 5,357,618 | 10/1994 | Mirza et al. | 395/400 |
| 5,367,656 | 11/1994 | Ryan | 395/425 |
| 5,377,336 | 12/1994 | Eickemeyer et al. | 395/375 |

OTHER PUBLICATIONS

IBM Technical Disclosure Bulletin V. 25, #11B, Apr. 1993, R. N. Rechtschaffen, "Cache Miss History Table", pp. 5978–5980.

D. Callahan et al, "Software Prefetching", Sigplan Notices, vol. 26 #4, Apr. 1991, pp. 40–52.

A.J. Smith, "Cache Memories", ACM Computing Surveys, vol. 14, #3, 1982, pp. 473–530.

D. R. Kaeli et al, "Trying Data Prefetching to Branch Prediction", IBM Tech. Discl. Bulletin, vol. 36, #10, Oct. 1993, p. 69.

R.N. Rechtschaffen et al, "New Context Bit", IBM Tech. Discl. Bul. vol. 30, #2, Jul. 1987, p. 510.

P. E. Emma et al, "Early Prefetch Buffer", IBM Tech. Discl. Bul. vol. 34, #10B, Mar. 1992, pp. 63–64.

Anonymous, "A Method to Allow Instruction Cache Access During a Reload Sequence", Research Disclosure, Oct. 1992 No. 34225.

Primary Examiner—David Y. Eng
Attorney, Agent, or Firm—Jay P. Sbrollini

[57] ABSTRACT

A operand prefetching mechanism is described for a system having a cache, in addition to its normal memory. The prefetch apparatus utilizes a table that records the location of each instruction that caused an operand miss and the location of the miss. Associated with this information is the address of each instruction fetch block that contains an instruction that caused an operand miss. The table is called an Operand Prefetch Table. With each instruction block fetched from the cache a search is made of the Operand Prefetch table to determine if the instructions found in this block previously caused operand misses. If the instruction block fetched matches an entry in the Operand Prefetch Table then a prefetch for future operands can be attempted for the instructions contained within the instruction block fetch segment.

22 Claims, 20 Drawing Sheets

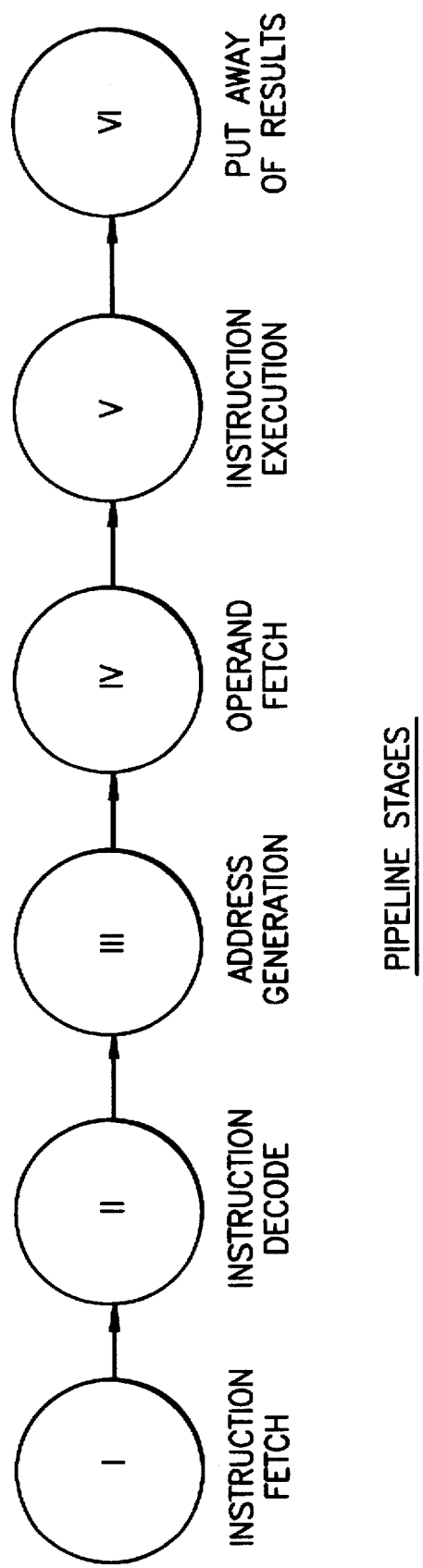

FIG. 5A

OPERAND PREFETCH TABLE 80

| DIRECTORY 81 | DATA 82 |
|---|---|
| ADDR OF INST-FETCH BLOCK ENTRY #1 | BLOCK-ENTRY INFORMATION SEGMENT #1 |
| ADDR OF INST-FETCH BLOCK ENTRY #2 | BLOCK-ENTRY INFORMATION SEGMENT #2 |
| ADDR OF INST-FETCH BLOCK ENTRY #3 | BLOCK-ENTRY INFORMATION SEGMENT #3 |
| | |
| ADDR OF INST-FETCH BLOCK AT ADDRESS X | BLOCK-ENTRY INFORMATION SEGMENT FOR X |
| | |

FIG. 5B
(DETAILED DESCRIPTION)

DATA PORTION 82

| INSTR ADDRESS IA | OPERAND MISS ADDR MA | STRIDE ST | C | V | INSTR ADDRESS IA | OPERAND MISS ADDR MA | STRIDE ST | C | V | LRU BITS |
|---|---|---|---|---|---|---|---|---|---|---|
| ← SUB-ENTRY #1 → | | | | | ← SUB-ENTRY #2 → | | | | | |

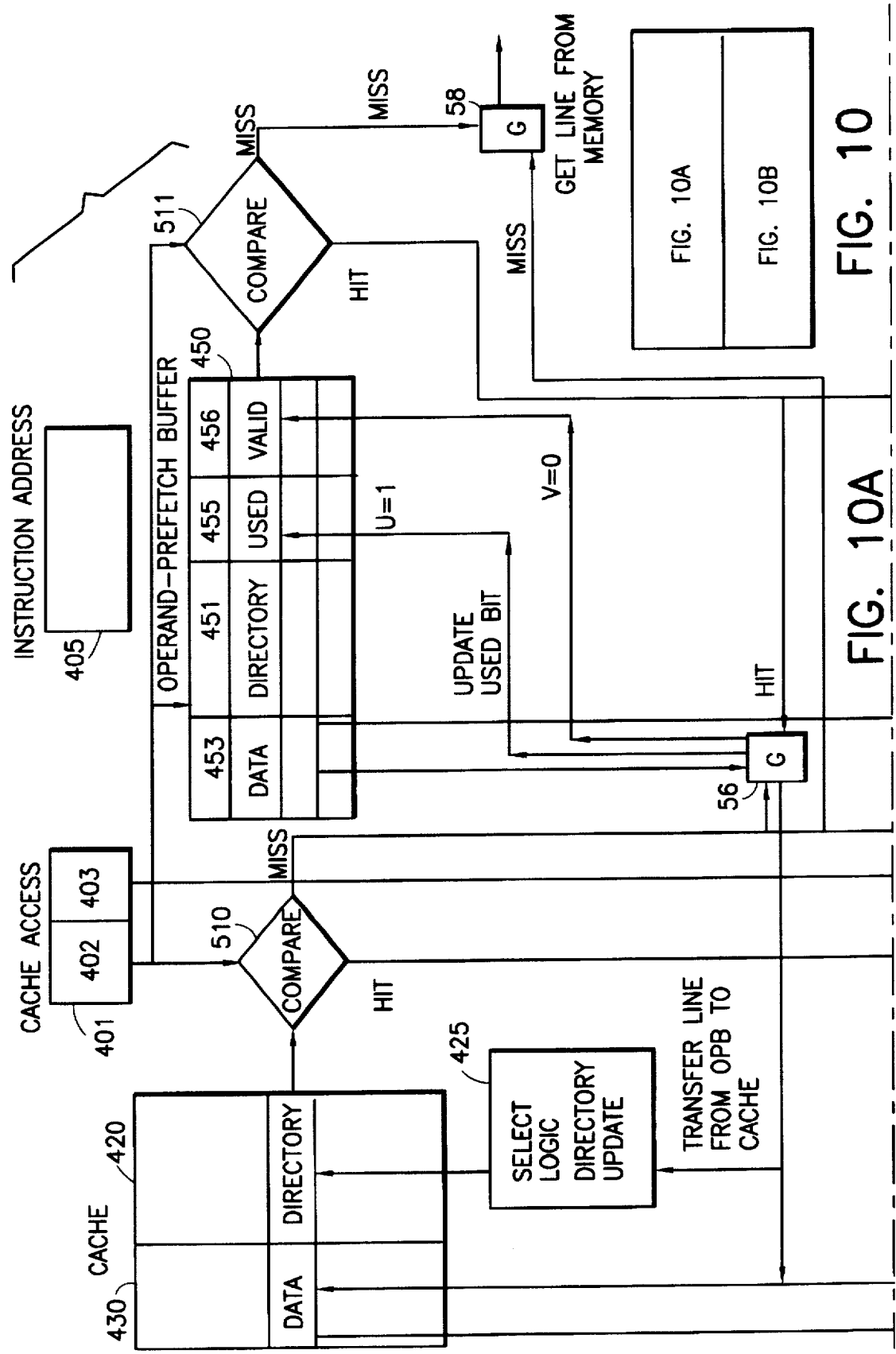

OPERAND PREFETCH TABLE

BACKGROUND OF THE INVENTION

1. Technical Field

The invention relates to computer processing units and, more particularly, to the fetching of data into cache memory of the computer processing unit.

2. Description of the Related Art

A cache is a small, high-speed buffer of memory, logically placed between the processor and memory, that is utilized to hold those sections of main memory that have been referenced most recently. Each section of memory transferred to the cache is called a line. Caches are needed in today's processors because the speed of the processor is much faster than the access time of the associated memory.

Any request made by the processor that is found in the cache can be satisfied quickly, usually in the next machine cycle. However, when a request made by the processor is not found in the cache, a cache miss must be satisfied from the memory. A cache miss usually takes several cycles to be satisfied. It is not uncommon for a cache miss to take 10 to 20 cycles to be satisfied from the memory in today's computers. Each cache miss delays the processor, usually, for the length of the miss.

Prefetching is a technique that is commonly used to reduce the delays to the processor caused by a cache miss. Prefetching schemes attempt to stage lines of memory into the cache before the processor would normally request them. If the prefetching scheme is successful, then the line is transferred from memory into the cache sufficiently far enough ahead, in time, of its use, thus hiding the difference in speeds between the processor and the memory. A number of systems are known in the art which use a prefetching mechanism to stage lines of memory to the cache before the processor would normally use them.

U.S. Pat. No. 4,807,110 to Pomerene et al describes a prefetching mechanism in which memory access pairs (P,Q) are remembered in a table. The table is called a shadow directory and each memory access pair represents a previous memory access and the next subsequent memory access. A prefetch is attempted only if a memory access pattern is repeated. A prefetch will not be attempted unless the memory access pattern is repeated.

U.S. Pat. 3,898,624 to R. J. Tobias describes a mechanism that prefetches the next sequential line from memory to a high-speed cache. The prefetched line will then replace an existing line in the cache. The prefetching scheme does not use any history and only relies on the spatial locality to generate prefetches. In this prefetch scheme an instruction fetch that causes a cache miss can only generate an instruction prefetch. Similarly, a data fetch cache miss can only cause a data prefetch. Instruction fetches cannot cause data prefetches and data fetches cannot cause instruction prefetches.

U.S. Pat. 5,093,777 to Ryan describes a mechanism where previous cache misses are stored in a first-in, first-out miss stack, and the stored addresses are searched for displacement patterns. Any detected pattern is then used to predict future misses by prefetching the predicted address. This strategy only uses the previous miss address to generate a prefetch address and does not association the instruction(s) that caused the miss with the prefetch address.

U.S. Pat. 5,305,389 to Palmer describes a prefetching mechanism that stores the access pattern of a program in a pattern memory. Prefetch candidates are obtained by comparing a current set of objects (accesses) to the objects (assesses) saved in the pattern memory. Patterns matches need not demonstrate a complete match to the objects saved in the pattern memory to generate a prefetch candidate. Prefetches are attempted for the remaining objects of each matching pattern.

U.S. Pat. 5,377,336 to Eickemeyer et al describes a mechanism that prefetches data into the cache. The prefetch mechanism scans the instruction buffer ahead of the decoder to identify the next load instruction in the instruction stream. If one is identified then a pre-decode unit computes the operand address using the current values in the registers specified by the load instruction. A data prefetch is then attempted for the operand address just computed. In addition, a history table saves the operand address of the last value loaded by the instruction and offset information from the previous address loaded by the instruction. An additional prefetch address can be obtained by adding the offset information and previous operand address. This prefetch mechanism is used to prefetch data in advance of the decoder and can only prefetch operands after the instructions have been fetched into the instruction buffers.

IBM Technical Disclosure Bulletin, Vol. 36 No. 10, October 1993, pp. 69–70, entitled "Tying Data Prefetching To Branch Prediction", by Kaeli et al, describes a prefetching mechanism in which data prefetching is coupled to branch prediction. The mechanism saved the address of previous operand misses in a Branch History Table. Whenever the Branch History Table is consulted to predict the action of a branch, either taken or not taken, if a match is found, then an operand prefetch can be attempted. Again, this mechanism can only attempt a prefetch during the course of branch prediction and the prefetches can only be attempted for cache misses that occurred in the past and are saved in the table. For this method to be effective the number of prefetch addresses saved in the Branch History Table must be much larger that the number of cache entries. This solution is impractical in many designs due to chip size and space limitations.

U.S. Pat. 4,774,654 to So et al describes a prefetching mechanism for a memory hierarchy. The memory hierarchy includes at least two levels, L1 and L2, wherein L1 is a small high-speed memory and L2 is much larger than L1 and slower. The L2 line size is also several times larger that the L1 line size such that each L2 line contains several L1 lines as sub-blocks. For example, if the L1 line size is 32 bytes and the L2 line size is 256 bytes, then each L2 line contains 8 L1 lines. The prefetching mechanism uses a bit encoding in each L2 line for the L1 sub-blocks (lines) that have been transferred to the L1. The prefetching mechanism will transfer all L1 sub-blocks in the L2 line that were used by the L1 whenever a L2 line is referenced.

Data prefetching can also be preformed by the programs that run on a computer. For example, in "Software Prefetch", by Callahan et al, published in Proceedings of the Fourth International Conference on Architectural Support For Programming Languages and Operating Systems, April 1991, new instructions are added to the instruction set that perform prefetching. These prefetching instructions behave like a load instruction except data is not transferred to the processor. The cache directory is searched for the prefetch address and if a miss occurs, then the data is transferred from the memory to the cache.

A compiler can insert these prefetching instructions into the program ahead of the load instruction in an attempt to assure that the data will be in the cache when actually used by the processor. Unfortunately, it is not easy or even possible for the compiler to insert prefetching instructions for operands in all cases. Also, there may be little performance benefit gained from the prefetching instruction if it is placed to close to the actual use of the data. Placing the prefetching instruction before a branch instruction can cause an incorrect prefetch to occur if the action of the branch was incorrectly predicted by the compiler.

U.S. Pat. 5,357,618 to Mirza describes a mechanism that can prefetch lines that are used within program loops. The mechanism uses two new instructions to control prefetching. More specifically, prior to a program loop, the compiler will insert the new instruction 'Move GPR To Stride Register' to insert a calculated stride value into a stride register. This actions enables prefetching by establishing a 'binding' between a GPR, used as an index register to address data within the loop and a Stride Register, used to calculate prefetch addresses. At the end of the loop, the compiler inserts the second new instruction 'Clear Stride Register Set' to inhibit prefetching of data. This action terminates the prefetching process.

SUMMARY OF INVENTION

The object of the invention is provide a mechanism to efficiently prefetch data from the memory into the cache.

It is also an object of the present invention to provide a prefetching mechanism that insures a high rate of usage of the prefetched information.

According to the present invention, an operand prefetch table (OPT) is utilized to record the address of each instruction fetch block that contains an instruction that caused an operand miss. Associated with each entry in the OPT is the address of the instruction that caused the operand miss, the last miss address, stride information regarding the distance between the last miss and next miss, and status information regarding the accuracy of the prefetches generated by this entry.

The address of each instruction fetch block generated by the processor is compared against the entries saved in the OPT. If a match occurs, then a prefetch can be attempted. Moreover, by saving the address of each instruction fetch block that contained an instruction that caused an operand miss, a prefetch attempt can occur for the operands of an instruction even before the instruction itself has been fetched from memory. By associating the miss address and stride information in the OPT, prefetches can be attempted for operands that have not been missed in the past. Also, the OPT saves the addresses of previously made instruction fetch blocks in a relatively small table, yet avoiding many of the cache misses associated with a relatively large cache. Simulation results have shown that many programs generate the majority of the operand misses from a relatively small number of instructions.

By providing an OPT of relatively small size in comparison to the cache, and using it to select candidates for prefetching, the probability of future cache hits is increased without increasing the cache size.

Other objects and advantages of the instant invention will become more fully understood upon consideration of the following detailed description presented in conjunction with the accompanying drawings.

BRIEF DESCRIPTION OF THE DRAWINGS

FIGS. 5(A) and (B) illustrate the structure of the Operand Prefetch Table (OPT) of FIG. 4 according to the present invention;

DETAILED DESCRIPTION OF THE PRESENT INVENTION

First, a description is set forth relative to how instructions and operands are fetched in a typical high performance processor without operand prefetching. Then, the structure and operations of a machine using an Operand Prefetch Table are given in more detail according to the present invention.

Figure 1:
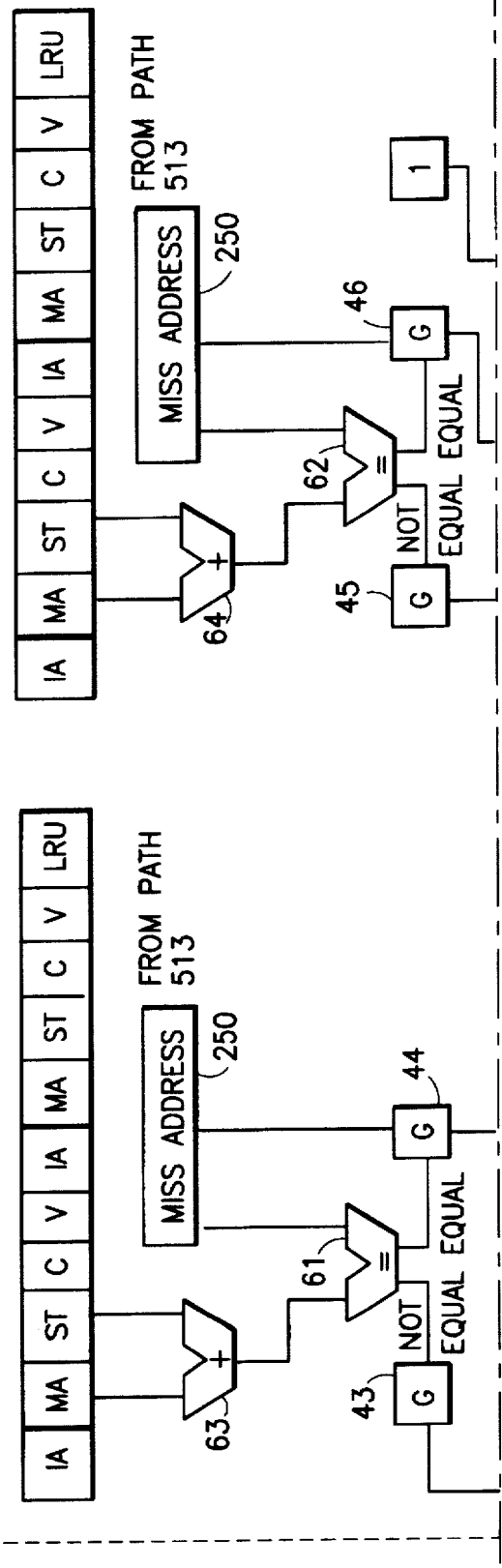
FIG. 1 is a pictorial representation of the stages of a pipelined processor.
Figures 2, 6D:
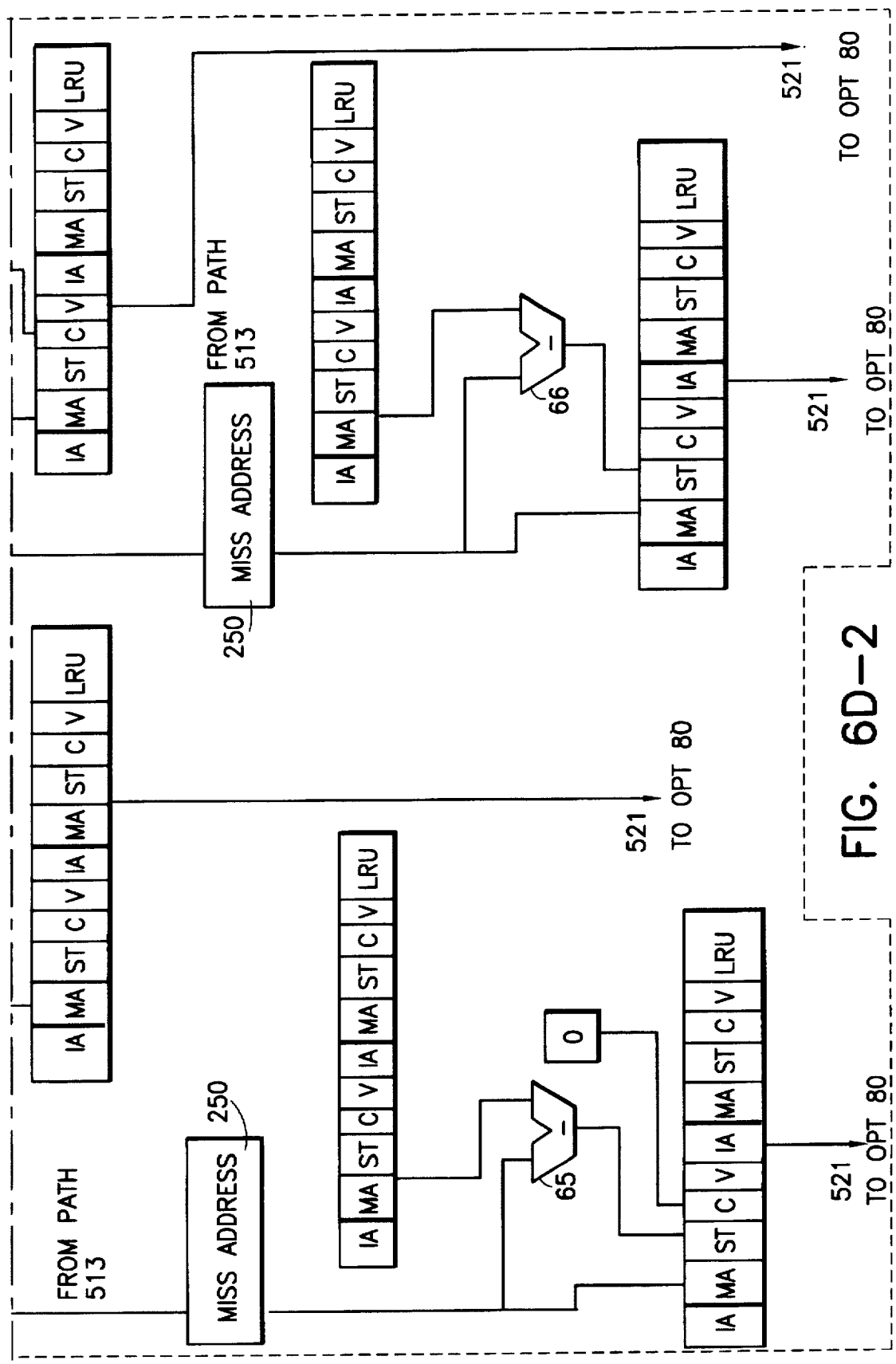

FIG. 1 shows the major components that make up a processor's pipeline. The components are: Instruction fetch (stage I), instruction decode (stage II), address generation (stage III), operand fetch (stage IV), instruction execution (stage V), and put away of results (stage VI). Ideally, each instruction enters the pipeline and spends one cycle at each pipeline stage; in this case, each instruction takes six cycles to pass through the pipeline. Thus, if the pipeline can be kept full, then each component of the processor (pipeline stage) can be kept active working on a different instruction, and one instruction can completed in every cycle. However, keeping the pipeline full is not easy. Pipeline stalls frequently occur and processing elements become idle and performance is lost.

Cache misses are one of the major causes of pipeline delays. Cache misses can occur during pipeline Stage I for instructions and during Stage IV for operands. In either case, a cache miss can stall the pipeline until the instructions or data are fetched from memory and delivered to the requesting processor element. It is not uncommon for a cache miss to cost a modern processor 10 to 20 cycles. It is the subject of this invention to prefetch operands into the cache before they would be normally requested during the operand fetch stage (IV) and avoid a pipeline disruption that can occur because of a cache miss.

Figures 2, 2A:
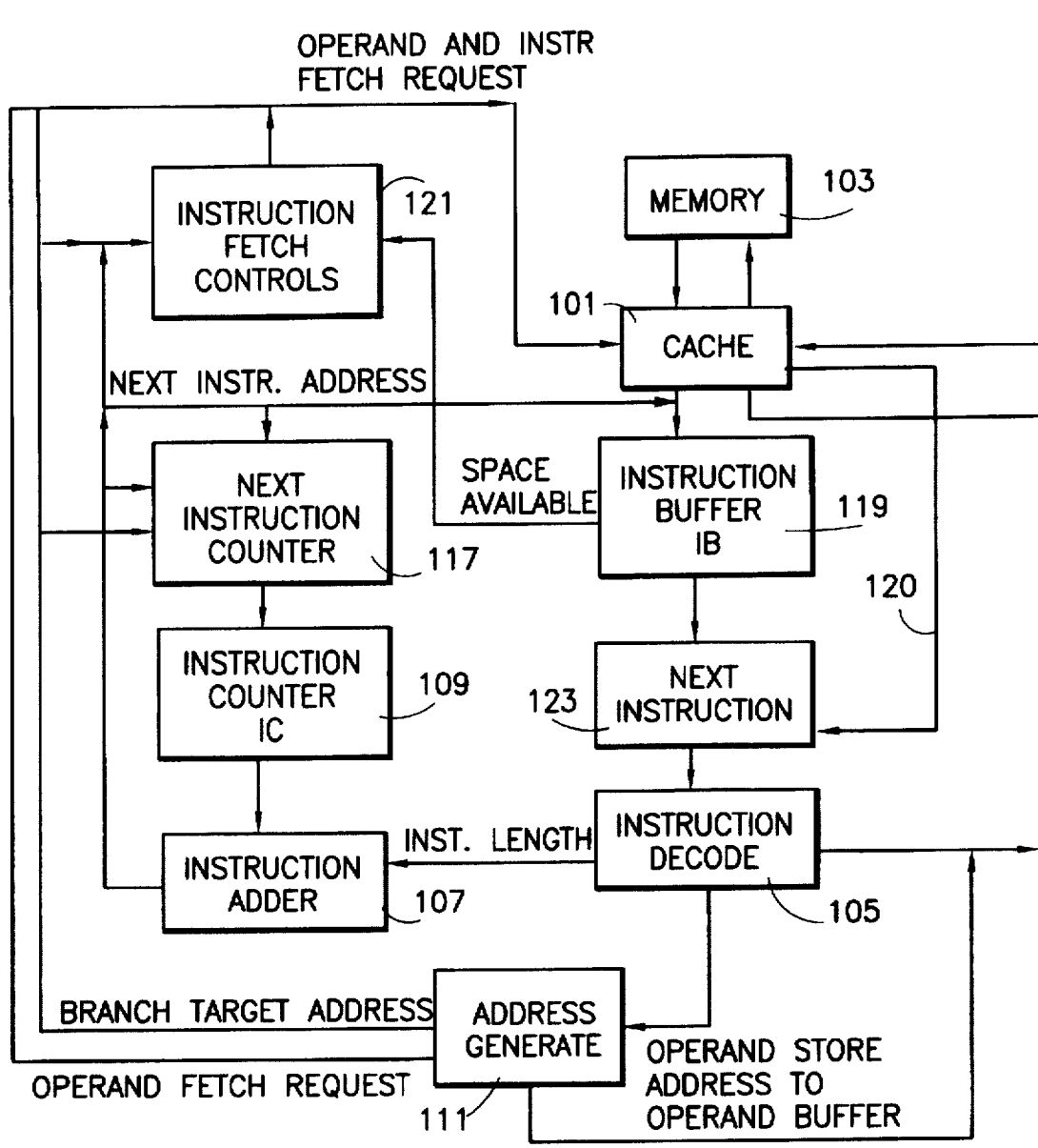
FIG. 2 is a functional block diagram of a conventional processor.
Figure 2B:
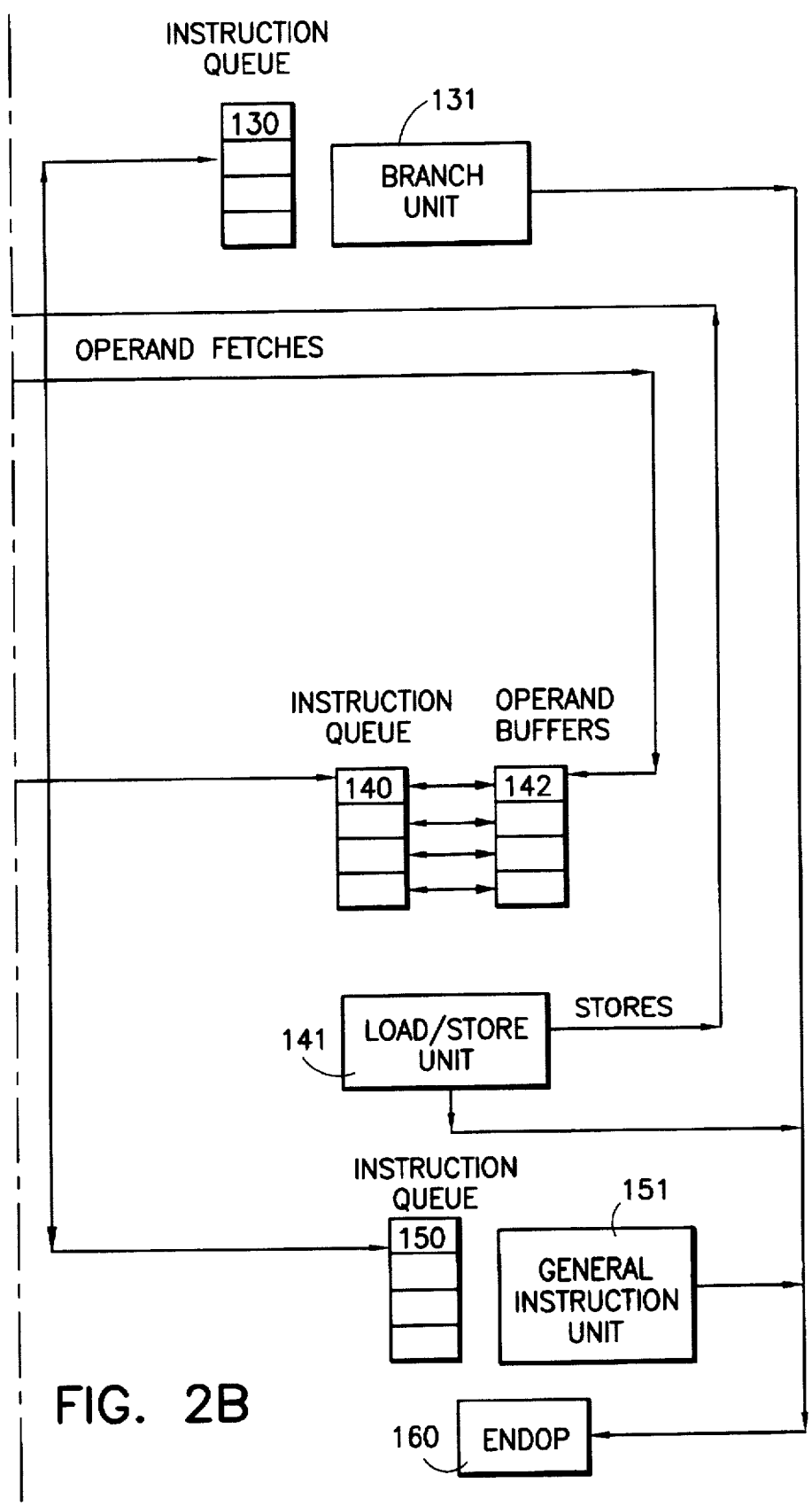

FIG. 2 is a functional block diagram illustrating the essential features of a typical high performance processor.

For illustrative purposes only, the figure emphasizes the instruction and operand fetching portions for a RISC-like pipeline processor where references to memory are limited to load and store instructions. However, the present invention is applicable to a non-RISC-like architecture wherein any instruction that references memory may cause an operand miss.

Instructions and operands are fetched from main memory 103 and stored in the cache 101. Each fetch specifies a 'line' of memory, where a line represents a fixed size block of information transferred between the cache and memory. Line sizes typically range from 128 to 256 bytes.

As shown, the cache 101 is a unified cache holding both instructions and operands. Alternatively, the cache 101 may be divided, one for instructions and one for operands, which is commonly called a split cache. A more detailed description of the structure of the cache 101 may be found in A. J. Smith, "Cache Memories", Computing Surveys, vol. 14, no. 3, September 1982, pp. 473–530, herein incorporated by reference in its entirety.

Instructions are staged from the cache 101 to an instruction buffer (IB) 119. The IB 119 typically holds the next N instructions in sequence following the one currently being decoded. Typical values for N are 8 or 16 instructions. Instructions can be fetched from the cache individually. However it is usually desirable to fetch instructions from the cache in blocks where a block is typically 8 to 16 bytes wide and the address of each block fetched is adjusted to an 8 or 16 byte boundary depending of the width of the block fetched. By retrieving several instructions per cache fetch, more cache cycles are available for operand fetching. For example, if each instruction is 4 bytes wide then four instructions are returned for each cache fetch made over a 16 byte wide bus.

An instruction counter (IC) 109 holds the address of the instruction currently being decoded, and an instruction decode register 105 holds the instruction currently being decoded. As instructions are loaded from the next instruction register 123 into the instruction decode register 105, three actions occur in parallel.

First, the instruction length information, which may be derived from the data stored in the instruction decode register 105, is added to the instruction counter address 109 stored in the instruction adder 107 to produce the next sequential instruction address. The output of the adder is then sent to the next instruction counter address 117, instruction fetch control (IFC) logic 121, and the instruction buffer 119. These actions will be discussed further below.

Second, the instruction stored in the instruction decode register 105 along with instruction execution information is placed in the execution queue of the appropriate execution unit. For example, the system may include a branch unit 131 for executing branch instructions, one or more general execution units 151 (one shown) for executing fixed point instructions and/or floating point instructions, and a load/store unit 141 for transferring operands to and from the cache 101. In this case, if the decoded instruction is a branch instruction, then the instruction is placed in a free position in the instruction queue 130 of the branch unit 131. If the instruction is a load or store instruction, then the instruction is placed in an empty position in the instruction queue 140 of the load/store execution unit 141. Similarly, all other instructions are placed in the next free position of the instruction queue 150 of the general instruction execution unit 151.

For simplicity of the description, it is assumed that the instructions are executed by the execution units in the order in which they are placed on the associated execution queue. Preferably, instructions are added to top of the execution queues, and each execution unit takes instructions off of the bottom of the associated execution queue.

Moreover, the load/store execution unit 141 preferably includes an operand buffer 142 associated with each position of the queue 140. The entries of the operand buffer 142 holds the operands for load instructions stored in the corresponding position of the execution queue 140. As is conventional, load instructions must wait in the execution queue 140 until their corresponding operand is returned from the cache 101 before execution can begin.

Third, if the instruction is a branch instruction, the branch address must be calculated, and, moreover, if the instruction is a load or store instruction, then the operand address must be calculated. More specifically, the operand address is generated in the address-generate mechanism 111. If the decoded instruction is a load instruction, then a "request-for-data" signal along with the address (from the address-generate mechanism 111) is then sent to the cache 101. The datum at that address is then returned from the cache 101 to the operand buffers 142. The operand is matched with its load instruction and placed in an entry of the operand buffer 142 that corresponds to the load instruction in the instruction queue 140. Store instructions also require that an operand address be generated. In this case, the operand address is saved in an entry of the operand buffer 142 corresponding to the store instruction and used by the load/store execution unit 141 to address the memory location updated after the store instruction is executed. Note that some architectures may generate a store pretest before each store is made. For these architectures a request is sent to the cache, similar to a load request, to verify that program owns the memory address that is to be modified.

Finally, an Endop function 160 marks the completion of the instruction where all results from the instruction are known throughout the machine and operand buffers and instruction queue positions can be marked available.

Return now to the output from the address adder 107. If the decoded instruction is not a branch instruction, the next sequential address, which is typically represented by the address output from the address adder 107, is sent to the IFC logic 121, next instruction counter 117 and instruction buffer 119. The IFC logic 121 keeps the instruction buffer full with the next N instructions in sequence following the one currently being decoded. The instruction buffer holds these N instructions and provides them quickly to the next instruction decode register 123. In parallel, the address from the next instruction counter register 117 becomes the current instruction counter register 109 value representing the address of the next instruction being decoded. The above mentioned sequence of events is then repeated for the next instruction.

As instructions are loaded from the IB 119 to the next instruction register 123, space becomes available for new instructions in the IB. The IB signals the IFC logic 121 to send another IB entry via an 'IB space available' signal. When this signal is raised, the IFC logic 121 requests from the cache 101 the next sequential instruction fetch beyond the last one requested. As mentioned above, the instructions are usually fetched in blocks and the IFC logic 121 must remember the address of the last block of instructions fetched. When the 'IB space available' signal is raised, the IFC logic 121 generates the address of the next sequential block and sends the fetch request and address to the cache 101. For example, if the address of the last block of instructions fetched was 100 and a 16 byte wide fetch block is used, then the address of the next block fetched is 116.

Return again to the output from the address adder 107. If the decoded instruction is an unconditional branch instruction, the address-generate mechanism 111 generates the target address of the branch instruction. The target address, along with a 'request-for-instructions' signal, is sent to the cache 101, the IFC logic 121, and the next IC register 117.

The cache 101 returns the instructions identified by the target address to the instruction buffer 119 and to the next instruction register 123 via path 120. The target address is required by the IFC 121 in order to update the last instruction fetch address, and is required by the next IC register 117 to identify the next instruction held in the next instruction register 123.

If the decoded instruction is a conditional branch, then a taken/not taken prediction must be made. Numerous branch prediction methodologies are known in the art. For example, two next-instruction registers 123 and two next-instruction-counter registers 117 may be provided to the IFC 121 such that both paths of the branch can be ready for selection when the outcome of the branch is known. Typically, branch prediction controls direct the IFC 121 to pursue instruction fetching down either the guessed taken path or the guessed not taken path of the branch. If the branch is guessed taken, then the IFC 121 will start fetching instructions in a manner similar to that described above with respect to a unconditional branch instruction. Similarly, if the branch is guessed not taken, then the IFC 121 will proceed to fetch instructions down the not-taken path as described above with respect to a non-branch instruction.

Branch prediction errors can be detected at various stages in the pipeline. For example, as soon as the condition code of the branch is known then every conditional branch can be predicted with certainty and the branch becomes, in essence, an unconditional branch. This can occur at various stages during the branch's execution. However, after execution of each conditional branch the branch's action, either taken or not taken, is compared to the branch guess, taken or not taken, and prediction errors can be detected. If a prediction error has occurred, then the appropriate next instruction register and next instruction count register are selected and the pipeline is restarted. Any instruction prefetched down the incorrect path which are in the instruction buffer may be discarded, depending on the buffer management rules.

As mentioned above, all load instructions must wait at the load/store execution unit 141 until the needed data is available from the cache 101. If the data is in the cache, then the data can be delivered to the appropriate operand buffer 142 on the next cycle. This will allow the instructions to proceed through the pipeline on the desired cycle-by-cycle schedule. However, if the operand is not in the cache then a 'cache miss', has occurred and execution of the load instruction will be delayed. It is the purpose of this invention to prefetch these operands into the cache before the address-generate mechanism 111 can request them. This will avoid delays that result when a load instruction is required to wait for the requested operand prior to execution.

According to the present invention, an operand prefetch table (OPT) is utilized to record the address of the most recently fetched instruction fetch blocks that contain instructions that caused an operand cache miss. Associated with each entry of the OPT is the address of the last operand miss, a stride value that indicates the distance (either plus or minus) from the last miss to the most recent miss for that instruction, a confirmation bit that indicates if the entry is correctly predicting a prefetch address, and a valid bit that indicates if the table entry contains valid information and can be used to prefetch future operands.

The OPT is accessed during the instruction fetch (I-fetch) phase of the pipeline (stage I of FIG. 1). This allows the OPT to initiate a prefetch for a load instruction even before the instruction has been decoded or even fetched from memory. More specifically, each instruction fetch made by the processor is compared against the address of previously made instruction fetch blocks that contain instructions that caused operand misses and, if a match occurs, an operand prefetch can be attempted. Note, that the address of the operand is generated even before the instruction is fetched from the cache. In fact, it is possible that the operand can be prefetched into the cache even before the instruction that uses the operand is in the cache.

By accessing the OPT during the instruction fetching phase of the pipeline, an attempt is made to identify the operand for each load or store instruction as early as possible, and fetch its operand even before the instructions are fetched into the instruction buffer. Ideally, this will avoid any pipeline delay caused by an operand miss.

Figures 3, 3A:
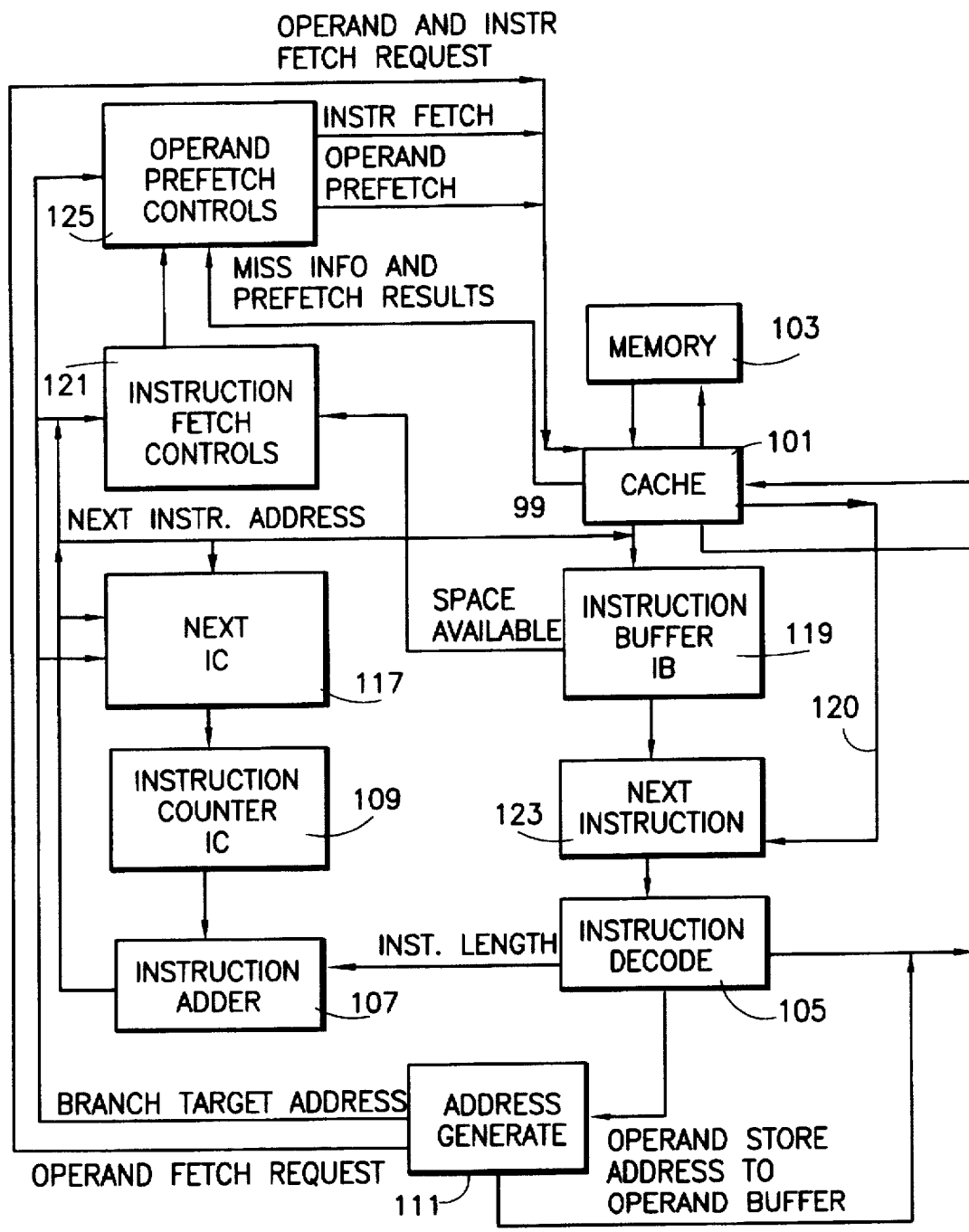
FIG. 3 is functional block diagram of a processor including operand prefetch control according to the present invention.
Figure 3B:
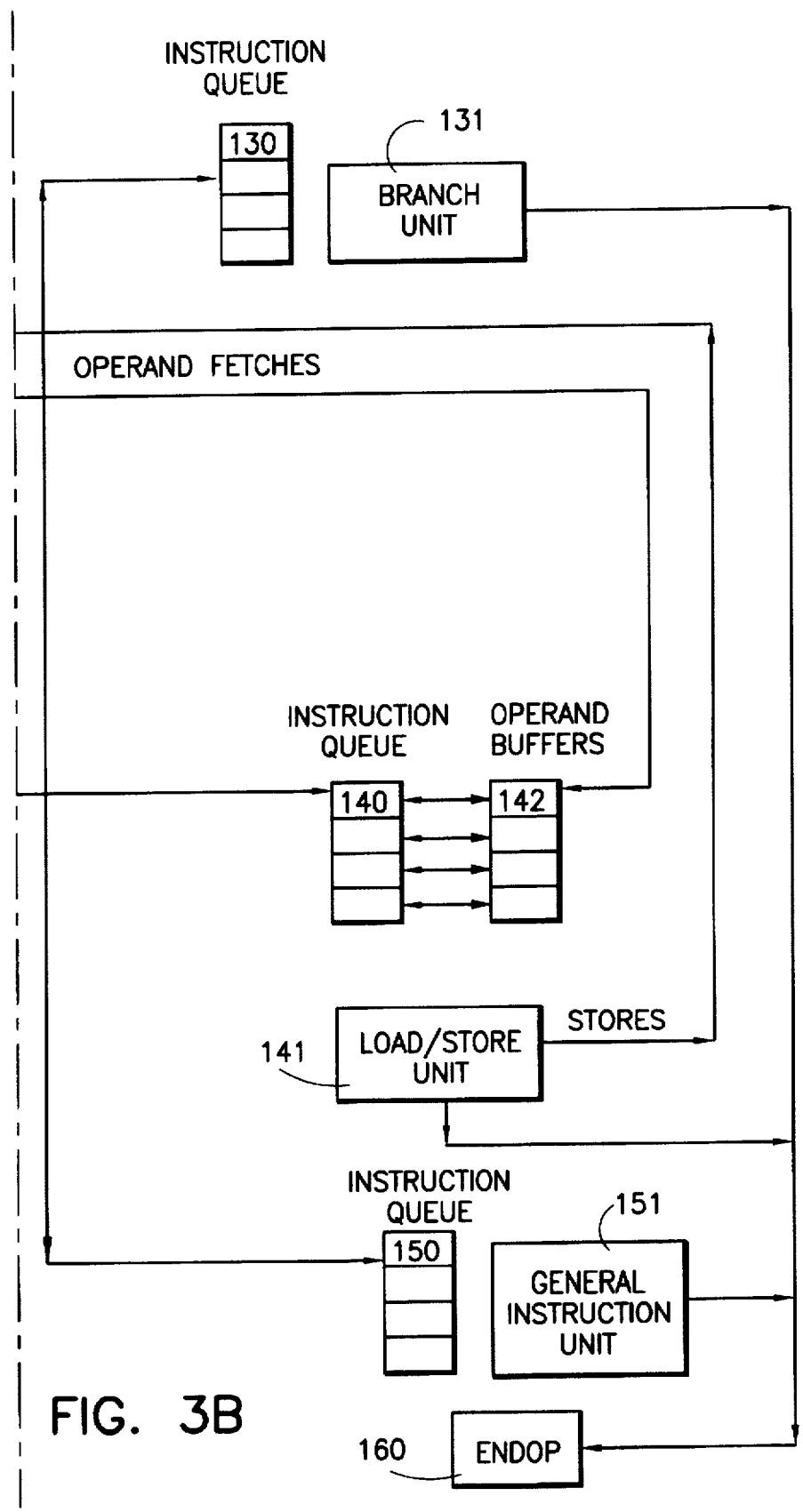

FIG. 3 extends the processor description shown in FIG. 2 and adds operand prefetch control (OPC) logic 125 that examines the address of each instruction-fetch block fetched from the memory 103 to the cache 101, and compares the address to the entries stored in the OPT. If a match is found, then an operand prefetch can be attempted. Regardless of an address match being found, the fetched instruction is forwarded to the cache 101. The cache 101 supplies the OPC logic 125 with the address of each operand miss and the address of the instruction that caused the miss via path 99. The address-generate mechanism 111 supplies this address information to the cache 101 along with each operand fetch request. This information is used to construct each OPT entry and verify that useful prefetches are being generated by the OPC logic 125.

Figure 4:
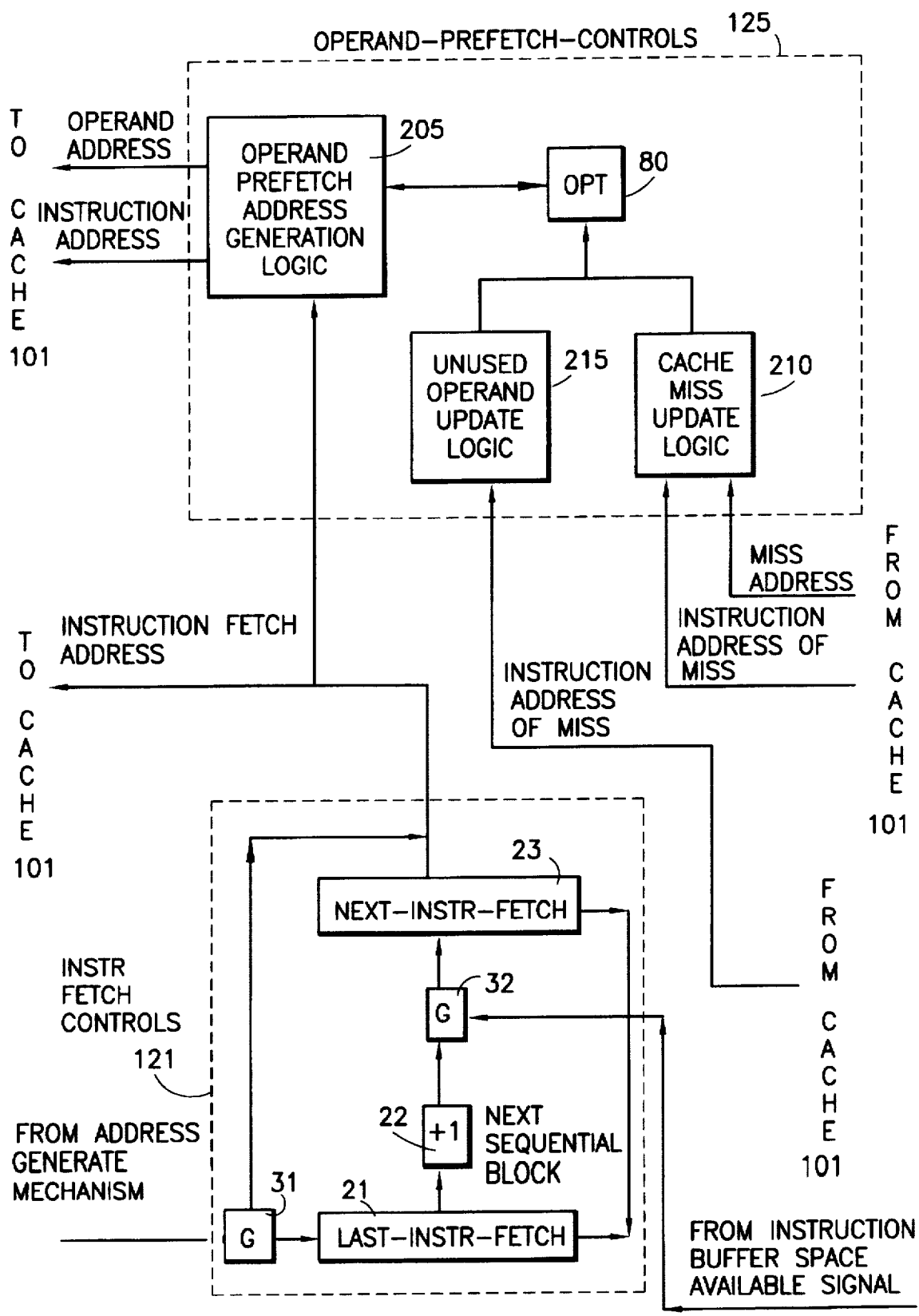
FIG. 4 is a functional block diagram of the instruction fetch control logic and operand prefetch control logic of the processor of FIG. 3 according to the present invention.

FIG. 4 shows in more detail the interaction between the IFC logic 121, the OPC logic 125 and the cache 101. The IFC logic 121 stores the address of the last instruction fetch in a last-instruction-fetch register 21. As mentioned above, instructions are fetched in blocks and the last-instruction-fetch register 21 contains the address of the last block of instructions fetched from the cache 101. Successive blocks are fetched by incrementing the address stored in the last instruction fetch register 21 to the next block using a block increment adder 22 and storing the next instruction fetch address in the next-instruction-fetch register 23. Note, if each instruction fetch is a 16 byte block (on a 16 byte boundary) then the block increment adder will increment the address in the last instruction fetch register 23 to the next 16 byte block.

The IB 119 signals the IFC logic 121 that space is available for another instruction fetch via gate 32. Upon receiving the space available signal from the IB 119, the address of the next sequential instruction fetch block stored in the next-instruction-fetch register 23 is sent to the cache 101 and, in parallel, to the OPC logic 125, and is also loaded into the last-instruction-fetch register 21.

The next instruction fetch address must also be updated upon experiencing unconditional branch instructions and conditional branch instructions predicted taken. More specifically, as shown in FIG. 3, the address-generate mechanism 111 may provide the target address of a branch instruction to gate 31 of the IFC logic 121 whenever an unconditional branch, or a conditional branch that is predicted taken, is decoded. The target address supplied to gate 31 is then loaded into the last-instruction-fetch register 21. This allows the IFC logic 121 to generate the next sequential instruction fetch address whenever the IB notifies the IFC logic 121 that space is available via gate 32. Moreover, the target address supplied via gate 31 is sent directly to the cache 101 and, in parallel, to the OPC logic 125.

A general description of the operation of the OPC logic 125 is now given, with a more detailed description following. The OPC logic 125 includes operand-prefetch address-generation logic 205 that compares the instruction fetch block address to entries contained in the OPT 80. As mentioned above, the OPT 80 includes entries that identify instruction fetch blocks that contain one or more instructions that caused an operand miss. If a match occurs, then a prefetch of suspected future operands can be attempted. The OPC logic 125 also includes OPT cache-miss-update logic 210 and OPT unused-operand-update logic 215. The OPT-cache-miss update logic 210 is supplied with update information from the cache 101 when an operand miss has occurred. Similarly, the OPT unused-operand-update logic 215 is supplied with update information from the cache 101 when the cache 101 has detected that a previously made prefetch has gone unused and is being discarded (or has been discarded). More specifically, when an operand miss is detected by the cache 101, the address of the missed operand and the address of the instruction causing the miss are sent to the OPT cache-miss-update logic 210, which saves the information in the OPT 80. This information is then utilized for subsequent detection of instruction fetch blocks that contain instructions that caused previous operand misses. If a previously made prefetch has not been utilized and is being discarded (or has been discarded) from the cache 101, the cache 101 sends the address of the instruction that caused the prefetch to the OPT unused-operand-update logic 215, which locates the entry in the OPT 80 corresponding to this instruction and prohibits the entry from making future operand prefetches until it can be verified that the entry can accurately predict operand misses.

As shown in FIG. 5(A), the OPT 80 may be arranged as an array of entries each having a directory portion 81 and a data portion 82. The directory portion 81 of each entry identifies instruction fetch blocks that contain at least one previously executed load or store instruction that caused an operand miss and the corresponding data portion 82 identifies the particular load or store instructions that caused the miss. As shown in FIG. 5(B), the data portion 82 contains one or more sub-entries (two shown). Each sub-entry identifies an instruction that caused an operand miss and the address of the miss.

Preferably, the directory portion 81 of each entry is an instruction fetch block address, and the sub-entries of the data portion 82 of the OPT 80 include an instruction address (IA) that specifies an address within the corresponding block address of an instruction that caused an operand miss and the address of the last operand that caused a cache miss (MA) for the instruction identified by IA as shown. Moreover, the sub-entries may include a stride value (ST) that records the distance from the last operand miss to the next operand miss for the instruction identified in IA, a confirmation bit (C) that indicates if the OPT 80 can successfully predict and prefetch the next operand miss for the instruction identified in IA, a valid bit (V) that indicates if the entry contains valid information, and LRU usage bits used to keep the most recent instructions that caused a miss in the data portions 82 of the entries.

To illustrate the features of the OPT 80, assume each instruction fetch block is 16 bytes and each instruction is four bytes, such that each instruction fetch block may contain up to four instructions. Consider a load instruction contained in instruction fetch block at address X and assume the load instruction caused an operand miss. In this case, because any instruction fetch block may contain up to four instructions that cause an operand cache miss, the information segments of the data portion 82 of the OPT 80 preferably identifies more than one instruction within the instruction fetch block that may cause an operand cache miss. As shown in FIG. 5, that information segments of the data portion 82 contain a maximum of two sub-entries each identifying a load/store instruction within the instruction fetch block that caused a cache miss. Utilizing two sub-entries is more than adequate for instruction fetch blocks of 16 bytes because instruction frequency analysis has shown that the occurrence of more than two load/store instructions within an instruction fetch block that cause a cache miss is extremely rare.

As described above, the IA of each sub-entry identifies an instruction that caused a operand cache miss. If each instruction must begin on a full word boundary, then the IA need only be two bits because there are only four possible positions that an instruction can begin in an instruction fetch block of 16 bytes.

The operand miss address (MA) may be a full address in order to identify a location within the range of the address space of the program. However, note that the operand miss address (MA) may also be abbreviated or truncated to specify only the line address of the operand that caused the miss.

As described above, the stride portion (ST) of each sub-entry represents the distance from the last miss to the next miss caused by the load (or store) instruction identified by the corresponding IA of the sub-entry. The stride portion (ST) may be a positive value or a negative value, thus indicating if the instruction is stepping through memory in a forward direction (a positive stride) or stepping through memory in a backward direction (a negative stride), respectively. Note, the stride portion may be abbreviated to specify a distance in cache lines between the address of the last miss and the address of the next miss.

As described above, the confirmation bit (C) indicates if the instruction identified by the IA field of the sub-entry is generating successful prefetches. A prefetch is successful if it is used before it is discarded from the cache. Conversely, a prefetch is unsuccessful if it is not used while it is in the cache. Preferably, the confirmation bit having a '1' (on) value indicates the sub-entry is predicting successful prefetches, while a '0' (off) value indicates the sub-entry is predicting unsuccessful prefetches. A feedback mechanism exists between the cache 101 and the operand prefetch mechanism to notify the OPT 80 about the outcome of each prefetch that is generated. Importantly, the operand-prefetch address-generation logic 205 of the OPC logic 125 enables or prohibits an operand prefetch as dictated by the operand miss address (MA) of a sub-entry according to the confirmation bit (C) of the sub-entry.

As described above, the valid bit (V) denotes whether the sub-entry is valid. Valid bits are needed to exclude un-initialized sub-entries that occur during system start-up time.

Finally, the LRU usage bits of each sub-entry are utilized to retain the more-recently-used sub-entries over the less-recently-used sub-entries of the OPT 80 for a corresponding instruction fetch block. If an instruction fetch block contains more load/store instructions than there are sub-entries in the corresponding data portion 82, then the replacement mechanism will be used to keep the sub-entries corresponding to the more recently referenced instructions and discard those sub-entries corresponding to instructions that were referenced the furthest time in the past.

Note, that FIG. 5(A) shows only one instruction fetch block address and associated information segment in each row of the OPT 80. However, the invention is not limited in this respect. Alternatively, the rows of the OPT 80 may contain a directory portion 81 that identifies multiple instruction fetch blocks, wherein the corresponding information segments include sub-entries that identify instructions within the multiple instruction blocks. In this case, the directory portion may include an LRU field that is utilized to retain longer the rows of sub-entries associated with the most-recently-used instruction fetch blocks.

FIGS. 6(A)–(D) illustrate in detail the OPT cache-miss-update logic 210 as shown in FIG. 4. When a cache miss is detected, the cache 101 supplies the OPT cache-miss-update logic 210 with the address of the miss and the address of the instruction that caused the miss. Note that both addresses are supplied to the cache 101 by the address-generate mechanism 111.

Generally, the OPT cache-miss-update logic 210 operates to compare the entries of the OPT 80 against the supplied address of the instruction that caused the miss to determine if an entry corresponding to the instruction causing the miss exists. If no matching entry is found, then a new entry is created and written to the OPT 80. If a matching entry is found, then the sub-entries corresponding to the particular entry are searched to determine if any one of the sub-entries corresponds to the instruction causing the miss. If a corresponding sub-entry is not found, then the particular entry of the OPT 80 is updated with a new sub-entry corresponding to the instruction causing the cache miss. However, if a corresponding sub-entry is found, the data encoded in the sub-entry is compared against the miss address supplied from the cache 101 to determine if the instruction identified by the IA field of the sub-entry is generating successful prefetches, and the confirmation bit C of the sub-entry is updated accordingly. As indicated above, the operand-prefetch address-generation logic 205 of the OPC logic 125 enables or prohibits an operand prefetch as dictated by the operand miss address (MA) of a sub-entry according to the confirmation bit (C) of the sub-entry.

Figure 6A:
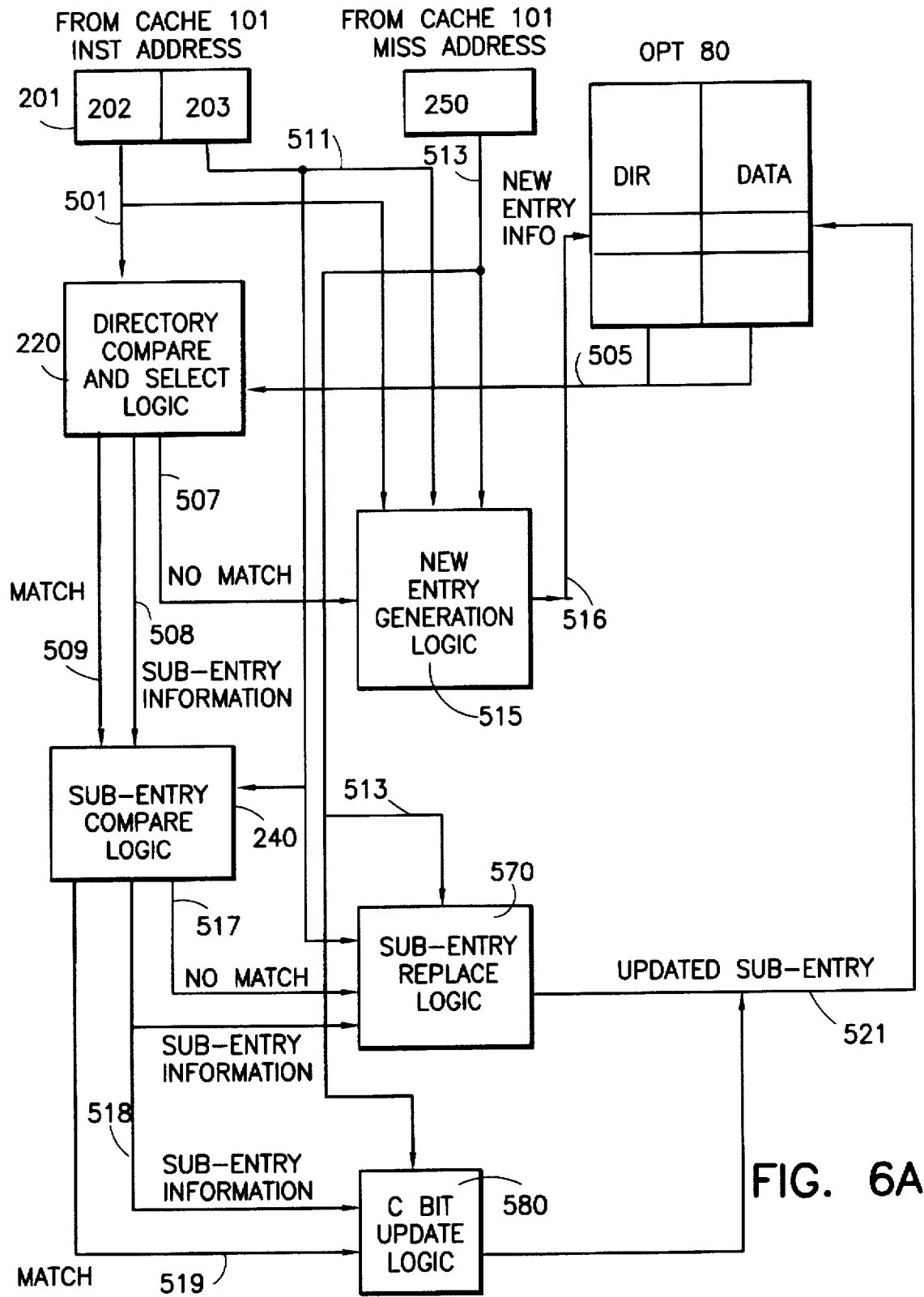
FIGS. 6(A)–(D) are functional block diagrams illustrating the OPT cache miss update logic of FIG. 4 according to the present invention.

More specifically, from FIG. 6(A), the OPT cache-miss-update logic 210 preferably divides the instruction address 201 provided by the cache 101 into two parts, a high order portion 202 and low order portion 203. Preferably, the high order portion 202 corresponds to the instruction fetch block address format of the directory portion 81 of the OPT 80, and the low order portion 203 identifies which instruction within the instruction fetch block caused the operand miss. In the example given above, the low order portion need only be two bits wide since at most 4 instructions can exist within an instruction fetch block segment of 16 bytes.

The high order portion 202 is supplied to directory-comparison-and-selection logic 220 via data path 501. Data path 505 supplies the directory-comparison-and-selection logic 220 with the directory portion 81 and corresponding sub-entry information 82 of the OPT 80 to determine if the high portion 202 of the instruction address matches the instruction fetch block address stored in the OPT 80. If no match is found, then a no match signal is sent on data path 507 to the new-entry-generation logic 515. If a match is found, then a match signal is sent on path 509 and the corresponding matching sub-entry information is sent on data path 508 to sub-entry comparison-and-selection logic 240. A more detailed description of the directory-comparison-and-selection logic 220 may be found in "Structural Aspects of the System/360 Model 85", IBM Systems Journal, Vol. 7, No. 1, 1968, pp. 2–21, herein incorporated by reference in its entirety.

Figure 6B:
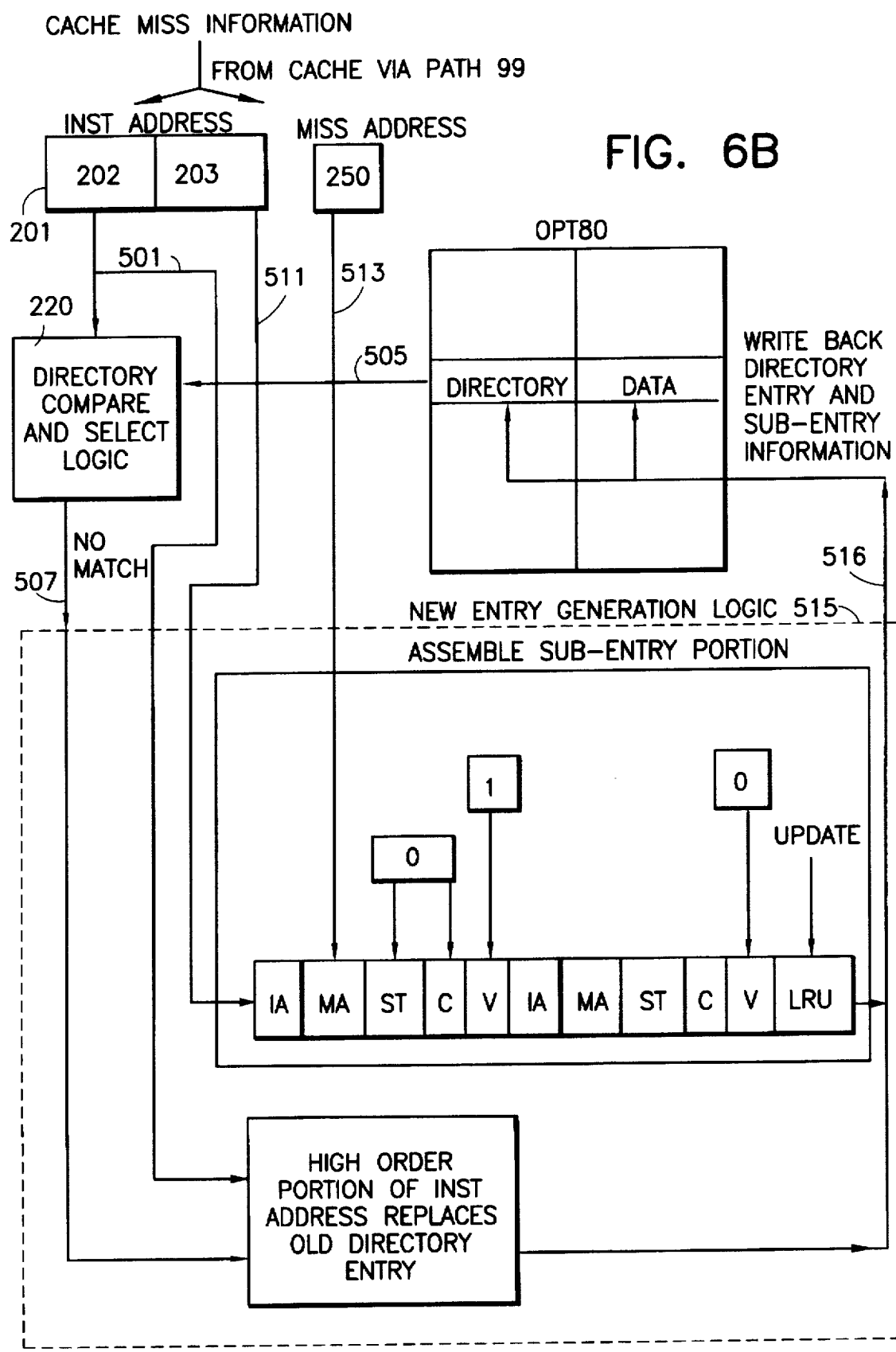

If a no match signal is raised by the directory-comparison-and-selection logic 220 on data path 507, then the high order portion 202 and low order portion 203 of the instruction address on paths 501 and 511, respectively, and the miss address 250 present on data path 513 are supplied to new-entry-generation logic 515. A more detailed description of the new-entry-generation logic 515 is shown in FIG. 6(B) and discussed below in detail. Upon receiving the no match signal output from the directory-comparison-and-selection logic 220 via data path 507, the new-entry-generation logic 515 generates a new entry corresponding to the instruction address 202 and miss address 250, and writes the new entry into the OPT 80 via data path 516. Preferably, when a new OPT directory entry is created, all prior sub-entry information is invalid. In this case, the new entry will cause one sub-entry field to be initialized with the new operand miss information and invalidate all other sub-entries. More specifically, the new-entry-generation logic 515 constructs the new entry by writing the high order portion 202 of the instruction address 201 into the directory portion of the new entry. Similarly, the first sub-entry field of the new OPT entry is selected and the low order portion 203 and the miss address 250 is placed in the IA field and MA field, respectively, of the selected sub-entry. The stride field (ST) and confirmation bit (C) of the sub-entry are initialized to zero. The confirmation bit (C) of the sub-entry is initially set to zero to inhibit the prefetching of operands for this instruction. Only when the confirmation bit is set to one, will a prefetch occur. Note that initializing the confirmation bit (C) of the sub-entry to zero is an implementation decision and does not effect the operation of the system described herein. Initializing the confirmation bit (C) to zero will bias the initial prediction to delay prefetching until it can be verified that the sub-entry can accurately predict prefetch addresses. In the alternative, the confirmation bit (C) may be initialized to one. In this case, the prefetch mechanism is biased to begin prefetching for the instruction on its next reference in the OPT. The valid bit (V) of the sub-entry is set to one. This indicates that the sub-entry contains useful information. However, the valid bits for the other sub-entries of the data portion of the new entry are set to zero. These sub-entries will not participate in future OPT inquiries until their valid bit (V) is set to one. Finally, the LRU bits of the sub-entries of data portion of the new entry are initialized to indicate the usage in time for all of the sub-entries in the data portion. Note, the one sub-entry is the most-recently-used in the group.

Returning to FIG. 6(A), if the directory-comparison-and-selection logic 220 detects a match between the high order portion 202 of the instruction address and a OPT directory entry, then a match signal is sent to sub-entry comparison-and-selection logic 240 via data path 509 along with the corresponding sub-entry information via path 508. The sub-entry comparison-and-selection logic 240, upon receiving the match signal output by the directory-comparison-and-selection logic 220 on data path 509, compares the low order portion 203 present on the data path 511 to the IA fields of the sub-entries of the matching entry read from the OPT 80 and present on the data path 508. If no match is detected, then a no match signal is sent via data path 517 and the selected sub-entry is sent via data path 518 to sub-entry replace logic 570. If a match is found, then a match signal is sent via data path 519 along with the matching sub-entry information via data path 518 to c-bit update logic 580.

Figure 6C:
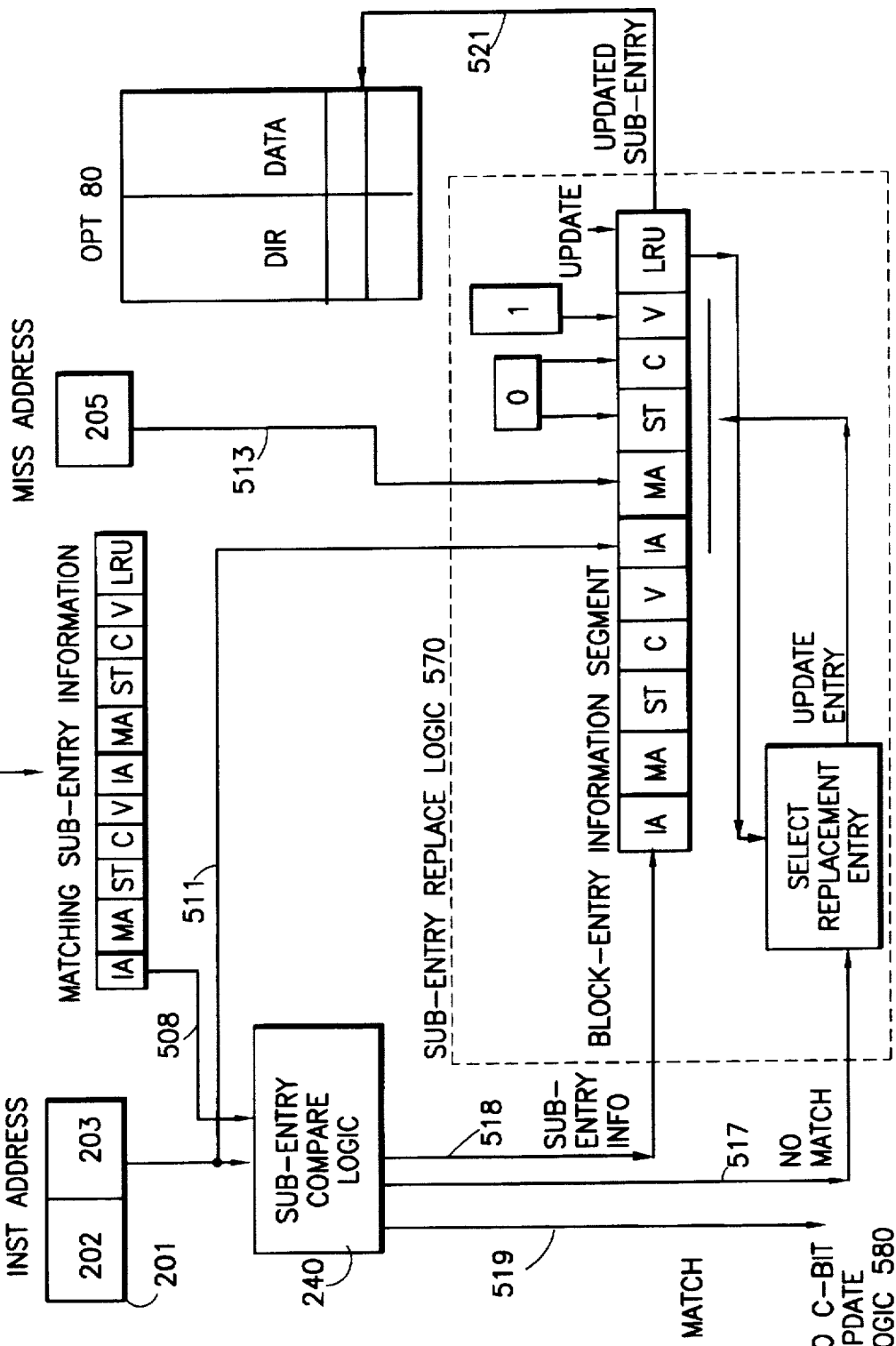

FIG. 6(C) describes the sub-entry replace logic 570 in more detail. When the no-match signal is present on data path 517, the sub-entry replace logic 570 utilizes the LRU bits of the sub-entries of matching directory entry present on the data path 518 from the sub-entry compare logic 240 to identify the least-recently-used sub-entry, and overwrites the least-recently-used sub-entry in the OPT 80 via data path 521 with a new sub-entry. The IA field of the new sub-entry corresponds to the low order portion 203 present on the data path 511, and the MA field of the new sub-entry corresponds to the miss address present on the data path 513. The stride field (ST) and confirmation bit (C) of the new sub-entry are initialized to zero. The valid bit (V) of the new sub-entry is set to one and the LRU bits for sub-entries of the data portion of the entry are updated to indicate the ordering, in time, of the sub-entries.

Returning to FIG. 6(A), when a match signal is present on data path 519 (i.e., a matching sub-entry corresponds the instruction causing the cache miss), the c-bit update logic 580 compares the data encoded in the matching sub-entry present on data path 518 to the miss address 250 present on data path 513 to determine if the instruction identified by the IA field of the matching sub-entry is generating successful prefetches, updates the confirmation bit (C) of the matching sub-entry accordingly, and then writes the updated sub-entry into the OPT 80 via data path 521.

Figure 6D:
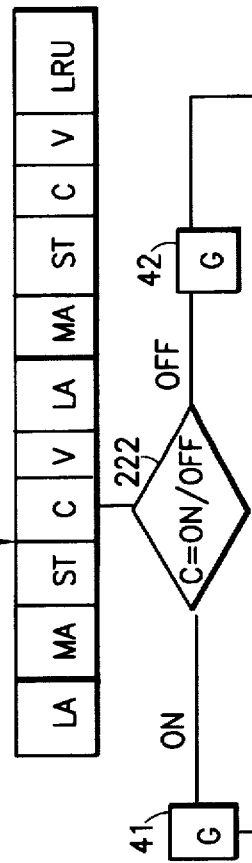

FIG. 6(D) illustrates a specific hardware embodiment of the c-bit update logic 580 of FIG. 6(A). As shown, the c-bit update logic 580 includes c-bit compare logic 222 that determines if the c-bit of the matching sub-entry present on data path 518 is on or off (i.e., set to "1" or "0", respectively). If the confirmation bit is on, the c-bit compare logic 222 enables gate 41. When enabled, gate 41 triggers the updating of the matching sub-entry present on data path 518. In this case, the stride field (ST) of the matching sub-entry is added by adder 63 to the miss address (MA) field of the matching sub-entry, and the resulting sum is compared to the miss address present on data path 513 by comparator 61. Note, the two fields preferably are compared only down to the line address. Comparing below this value, for example to the word or bytes, is unnecessary because it only needs to be verified that the OPT entries predicted accurate prefetch addresses, where the prefetch address identifies a cache line. If the comparator 61 determines these values are equal, then the sub-entry is a valid predictor of a future operand miss for that instruction. Gate 44 detects the equal condition output from comparator 61, updates the MA field of the matching sub-entry with the miss address present on the data path 513 and writes the updated sub-entry to the OPT via data path 521. In this case, the confirmation bit (C) of the sub-entry is left on. However, if the comparator 61 determines the sum of the stride field (ST) and MA field of the matching sub-entry does not equal the miss address 250 present on the data path 513, then the sub-entry is not a valid predictor of a future operand miss for that instruction. Gate 43 detects the not equal condition output from the comparator 61 and triggers the following:

1] the confirmation bit (C) of the sub-entry is set to zero;

2] the stride field (ST) of the sub-entry is updated with the difference between the miss address 250 present on the data path 513 and the MA field of the sub-entry;

3] the MA field of the sub-entry is updated with the miss address present on the data path 513; and 4] the updated sub-entry is written to the OPT via data path 521.

Note that setting the confirmation bit of the entry to zero inhibits the prefetching of operands for this particular sub-entry.

If the c-bit compare logic 222 detects that the confirmation bit is off, gate 42 is enabled. When enabled, gate 42 triggers the updating of the matching sub-entry present on data path 518. In this case, the stride field (ST) of the matching sub-entry is added by adder 64 to the miss address (MA) field of the matching sub-entry, and the resulting sum is compared to the miss address present on data path 513 by comparator 62. Note that the adder 64 and comparator 62 perform the same function as the adder 63 and comparator 61, and thus may be implemented utilizing shared circuitry. Again, the comparison is only performed down to the line address. If the values supplied to the comparator 62 are equal, then the matching OPT sub-entry can be used to predict future operand misses. Gate 46 detects this equal condition output from comparator 62, updates the MA field of the matching sub-entry with the miss address present on the data path 513 and writes the updated sub-entry to the OPT via data path 521. However, in this case, the confirmation bit (C) of the sub-entry is turned on. If the comparator 62 determines the sum of the stride field (ST) and MA field of the matching sub-entry does not equal the miss address 250 present on the data path 513, then the sub-entry is still not a valid predictor of a future operand miss for that instruction. Gate 45 detects the not equal condition output from the comparator 62 and triggers the following:

1] the confirmation bit (C) of the sub-entry is not changed and remains zero;

2] the stride field (ST) of the sub-entry is updated with the difference between the miss address 250 present on the data path 513 and the MA field of the sub-entry;

3] the MA field of the sub-entry is updated with the miss address present on the data path 513; and 4] the updated sub-entry is written to the OPT via data path 521.

So far, the description of the present invention has dealt with setting and resetting (updating) of the entries of the OPT 80. Next, a description of the method and apparatus that generates an operand prefetch is presented.

Figure 7:
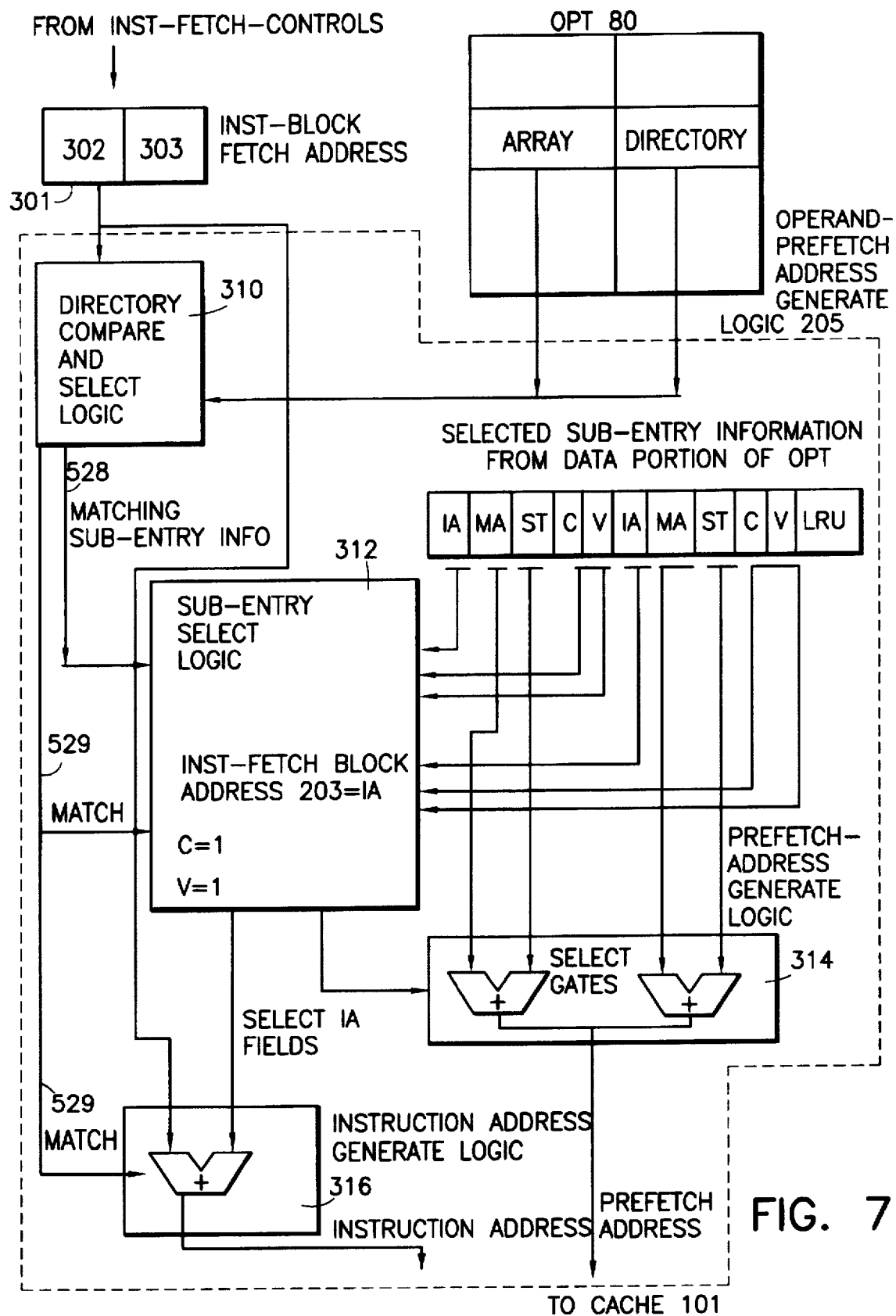
FIG. 7 is a functional block diagram of the Operand Prefetch Address Generation logic of FIG. 4 according to the present invention.

FIG. 7 illustrates in more detail the operand-prefetch address-generation logic 205 of the OPC logic 125 of FIG. 4 that is responsible for generating prefetches. Generally, the operand-prefetch address-generation logic 205 operates to compare the entries of the OPT 80 against the instruction block fetch address supplied from the IFC logic 121 to determine if an operand prefetch exists for an instruction within an instruction block that is recommended to be executed. If no matching entry is found, then an operand prefetch is not attempted. However, if one or more valid sub-entries whose confirmation bit (C) and valid bit (V) are set to one are found within the instruction fetch block, then an operand prefetch dictated by the matching sub-entries is attempted.

More specifically, as shown in FIG. 7, the operand-prefetch address-generation logic 205 preferably divides the instruction block fetch address 301 provided by the IFC logic 121 into two parts, a high order portion 302 and low order portion 303. Preferably, the high order portion 302 corresponds to the instruction fetch block address format of the directory portion 81 of the OPT 80. The high order portion 302 is supplied to directory-compare-and-select logic 310 that interfaces to the OPT 80 to determine if the high portion 302 matches the instruction fetch block address stored in the directory portion 81 of the entries of the OPT 80. If a match is found, the directory-compare-and-select logic 310 outputs a match signal and the data portion 82 of the matching entry via paths 529 and 528, respectively, to sub-entry select logic 312. Upon receiving a match signal output from directory-compare-and-select logic 310, the sub-entry select logic 312 determines if any instructions identified by the sub-entries of the corresponding data portion caused a previous operand miss. All sub-entries of the corresponding data portion whose confirmation bit (C) and valid bit (V) are set to one are candidates to generate operand prefetches. Note that the prefetch address need only to be calculated down to the cache line address and that multiple sub-entries in the data portion may qualify as prefetch candidates. In this case, the IA field of each qualifying sub-entry may be utilized to order the prefetch requests. For example, the sub-entry with the smallest IA value may be used to generate the first prefetch request. Subsequent prefetch requests are generated using the next highest IA field value until prefetch requests corresponding to all the qualified candidates have been generated. Recall, the IA field identifies each instruction, by address, contained within each sub-entry field of the OPT 80. In the example above, it is assumed that the order of execution for the instructions contained in the instruction fetch block is from smallest to highest.

Sub-entry select logic 312 supplies the IA field of each qualified sub-entry to the prefetch-address-generate logic 314 wherein the prefetch address is generated by adding the miss address field MA to the stride field ST. A prefetch address is assembled for each sub-entry that has its confirmation bit (C) and valid bit (V) set to one. In addition, instruction-address-generate logic 316 generates an instruction address for each prefetch address. The instruction address is assembled from the high order portion 302 of the instruction fetch address and the selected IA field of the matching sub-entry of the data portion of the OPT 80. The prefetch address generated by the prefetch-address-generate logic 314 and corresponding instruction address generated by the instruction-address-generate logic 316 are then output to the cache 101 for processing, which will be described in more detail below subsequent to a description of the cache.

The structure and operations of the cache 101 are now described. The description of the cache 101 is presented in three parts. First, the normal operations of the cache 101 without prefetching are presented. Second, the cache 101 is modified to include prefetch buffers that allow for prefetching. Finally, the operations of the cache 101 satisfying a prefetch request are described.

Figure 8:
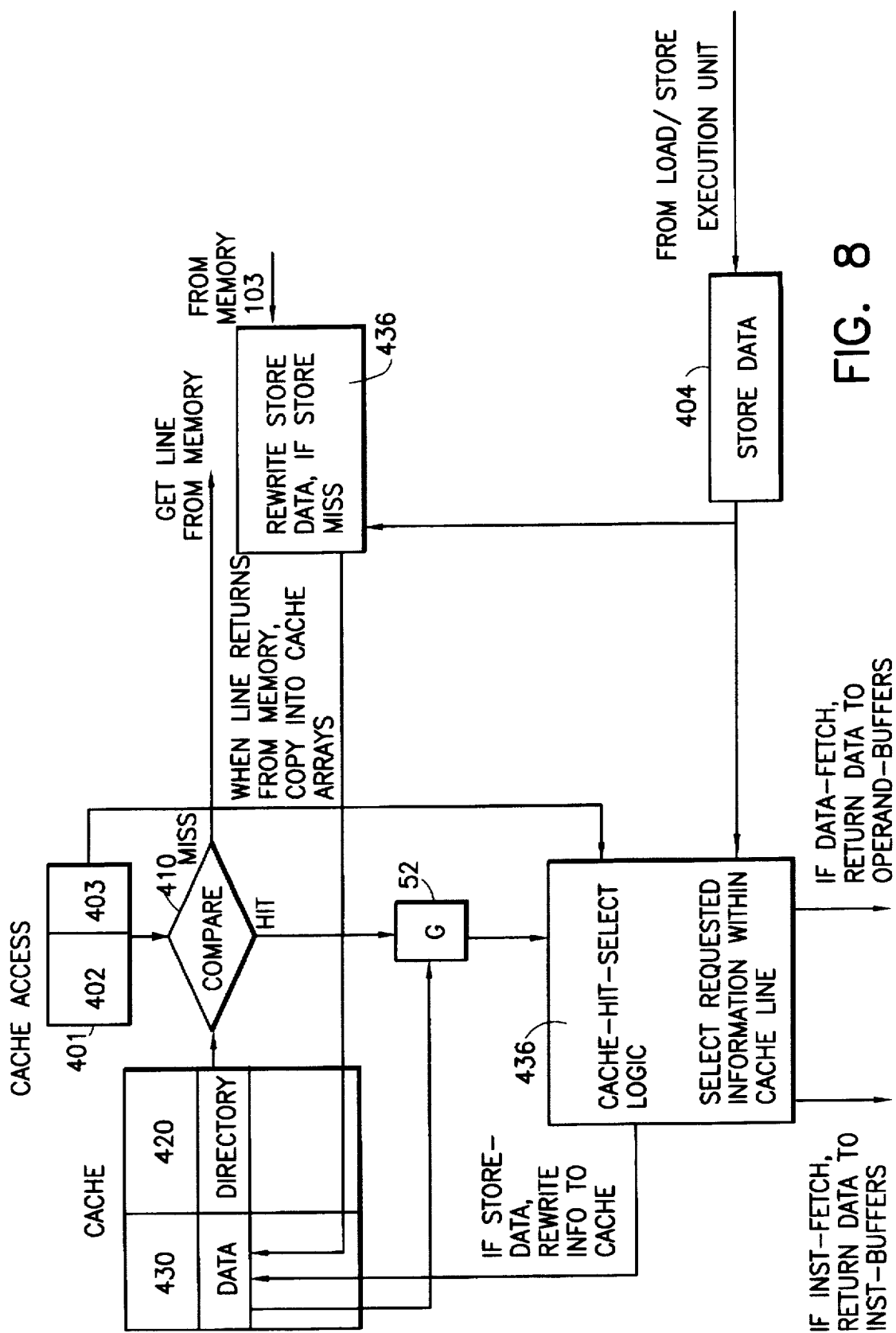
FIG. 8 is a functional block diagram of the cache of FIG. 3 in processing a fetch request.

FIG. 8 illustrates the operations of a cache 101 processing a normal request. Each cache request is presented to the cache 101 as an address 401. Preferably, the address 401 is divided into two parts, a high order portion 402 and low order portion 403. The high order portion 402 identifies the line of data specified by the address 401 that is transferred between the memory 103 and the cache 101 whenever a cache miss occurs. The low order portion 403 identifies the byte (or word) within the line. For example, if a line size of 128 bytes is used in the design of the cache 101, then the low order portion of the address would be 7 bits long, 2**7=128.

As each address is presented to the cache 101, the high order portion 403 is compared against the line addresses held in the cache directory 420. As shown, the cache 101 is preferably divided into entries each having two portions, a directory portion 420 and a data portion 430. The directory portion 420 of each entry identifies the line of memory held in the corresponding data portion 430 of the entry. As is conventional in the art, note that an address typically represents a virtual address and that a translation is needed to a real address. Also note that the cache directory and data portion may be arranged in sets and that the high order portion of the address can be additionally divided into a set identifier and line identifier.

More specifically, the high order portion 402 is supplied to compare logic 410 that interfaces to the cache 101 to determine if the high portion 402 matches the directory portion 420 of the entries of the cache. If a match occurs, then gate 52 is activated. Gate 52 signals cache-hit-select logic 435 to forward the requested information to the requesting processor element. The cache-hit-select logic 435 uses the low order portion 403 of the cache address to select the requested bytes (or word) within the selected line stored in the data portion 430 of the cache. Typically, there are three types of requests sent to the cache: instruction-fetch, data-fetch, and data-store requests. If the cache request was an instruction-fetch, then cache-hit-select logic 435 will forward the requested information to the instruction buffer 119. If the cache request was a data-fetch, then cache-hit-select logic 435 will forward the requested information to the operand buffers 142 associated with the load/store unit 141. If the cache request was a store-data request, the cache request was the result of a store instruction and the store-information 404 replaces the selected information and is written back to the cache.

If the high order portion 402 does not match the directory portion 420 of any entry, then a cache miss has occurred. In this case, the miss address is then sent to memory 103, and an entire line of the memory 103, which is identified by the miss address, is sent back to the cache 101. When a cache miss is detected, a replacement algorithm exists to select a line that is currently in the cache 101 to be overwritten by the miss when it returns from memory 103. The directory portion 420 of the entries can then be updated with the address of the new line (miss), and when the line arrives at the cache 101, the information is written into the array portion 430 of the selected entry. If the miss is the result of a store-data request, the logic 436 will replace the portion of the line that returns from memory with the store information 404 that caused the miss. Typically, several cycles are required to transfer a line from the memory 103 to the cache 101. Conventionally, the missing line is divided into packets wherein each packet is as wide as the transfer bus between the cache 103 and memory 101. For example, if the bus between the memory 103 and the cache 101 is 8 bytes wide and a 128 byte line size is used, then 16 cycles are required to transfer the entire line between the memory 103 and the cache 101.

In order to facilitate prefetching, a prefetch buffer may be added to the cache 101. A prefetch buffer holds those lines of memory that were transferred from the memory 103 to the cache 101 as the result of a prefetch request, and not as the result of a normal cache miss. Note, when a cache design provides for prefetching, two types of misses may occur: prefetch misses and demand (or normal) misses. A prefetch miss is a prefetch request that causes a cache miss. In this instance, the line returned from memory 103 is sent to the prefetch buffer and will be transferred to the cache 101 when it is used by the processor. On the other hand, a normal (or demand miss) is a cache miss that was not a cache prefetch. In this instance, the line of memory returned after a demand miss is sent directly to the cache 101. A demand miss is the result of normal instruction fetch request generated by the IFC logic 121, the operand requests from the address-generate mechanism 111, and stores sent to the cache 101 from the load/store execution unit 141.

Prefetch buffers are well known in the art. For example, IBM Technical Disclosure Bulletin articles: A Method to Allow Instruction Cache Access During a Reload Sequence", October 1992, No. 342; "Early Prefetch Buffer", Vol. 34 No. 10b, March 1992 pp. 63–64; "New Context Bit", July 1987 pp. 510 describe miss or prefetch buffers in which a line of memory is transferred into a buffer before it is loaded into the cache, all incorporated herein by reference in their entirety. There are several reasons why lines returned from memory 103 as a result of a prefetch miss should be sent to a prefetch buffer, and not loaded directly into the cache 101 as with a normal miss.

First, prefetches are a guess or prediction that a line will be used by the execution units of the system. If prefetched data is copied directly into the cache 101, then the cache's replacement algorithm may discard a line already in the cache 101. If the prefetched data is unused while in the cache 101, then the cache 101 has been contaminated with useless lines, thus wasting valuable cache space. The prefetch buffer acts as a filter for all prefetches and only allows the prefetched data that is used by the processor to be placed into the cache 101.

Second, if the prefetched line is copied into the cache 101, then the replacement algorithm must choose a line currently in the cache to be overwritten by the prefetched line. If the replaced line is re-referenced before the prefetched line is referenced, then an additional cache miss occurs. That is, the line just discarded from the cache 101 must be re-accessed from the memory 103 before the cache request can be satisfied.

Third, if the prefetched line is copied into the cache, then cache references may be blocked during the line transfer cycles. Recall, that if the cache line size is 128 bytes and the transfer bus is 8 bytes wide, then 16 cycles are required to transfer the line from the memory 103 into the cache 101. During this period a cache request from the instruction fetch controls or operand fetch controls may be blocked because the data portions of the cache are unavailable.

Figure 9:
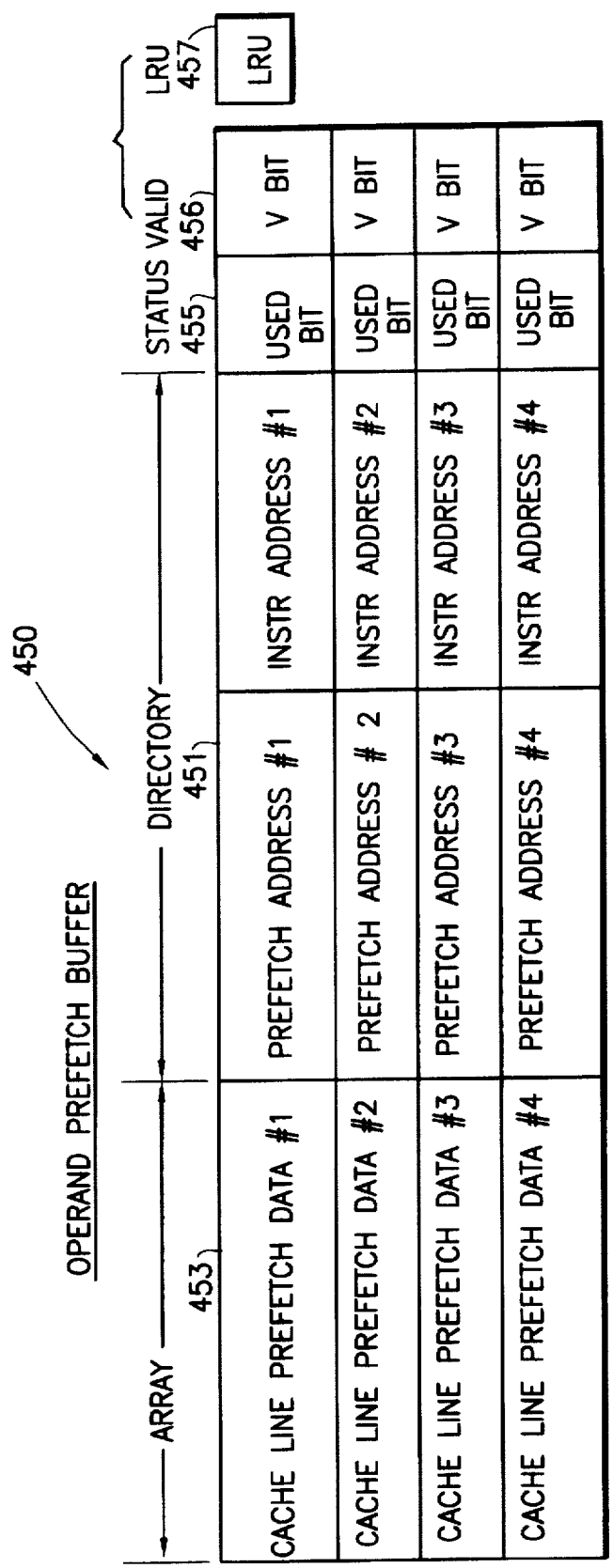
FIG. 9 is a table illustrating the structure of an Operand Prefetch Buffer (OPB) according to the present invention.
Figure 10B:
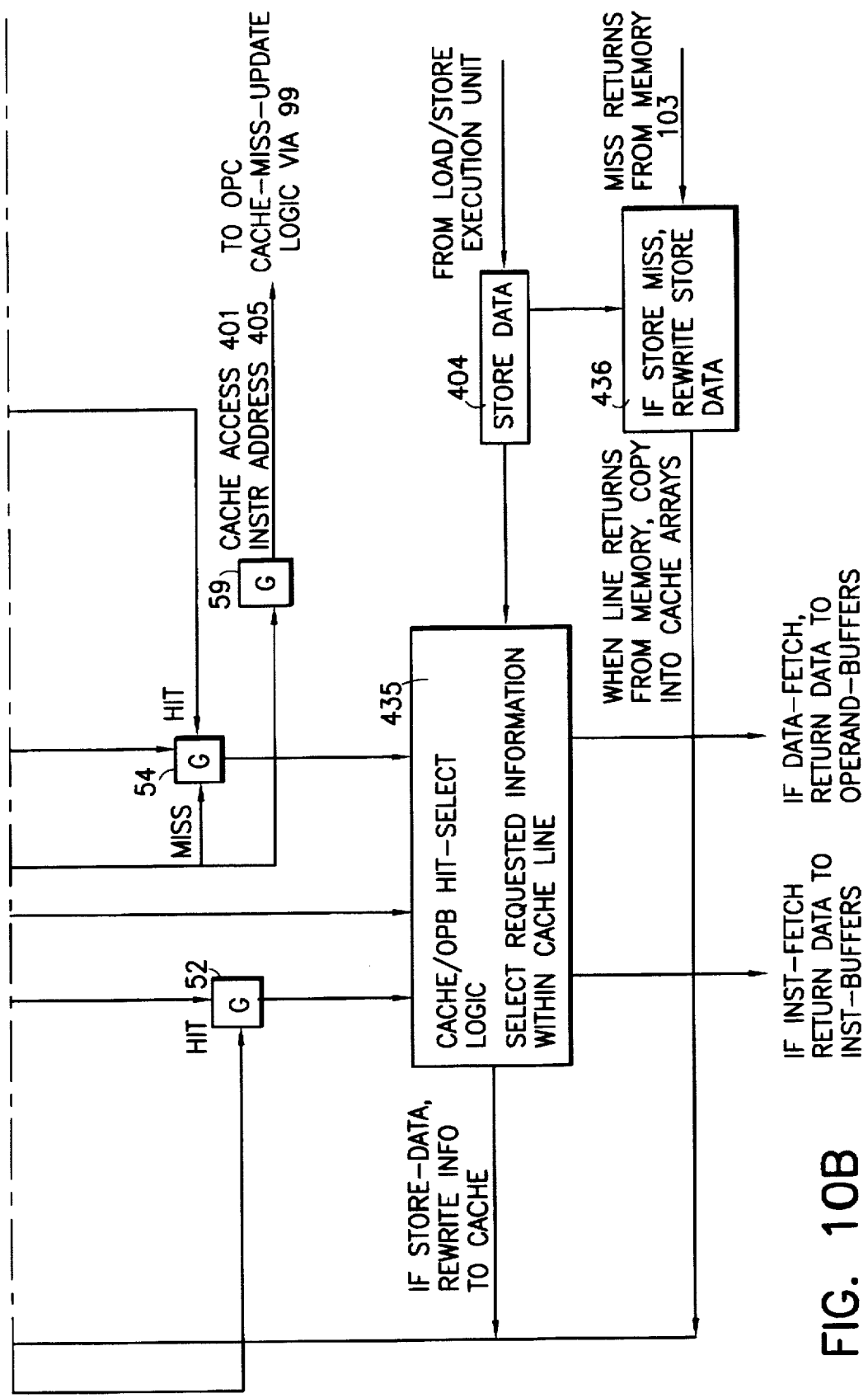
FIG. 10 is a functional block diagram of the cache of FIG. 3 in processing a fetch request, wherein the cache includes a prefetch buffer.

FIGS. 9 and 10 and the accompanying description below illustrates the structure and operation of the cache 101 including an operand prefetch buffer (OPB) 450. The OPB 450 temporarily stores the lines of memory 103 that are prefetched to the cache 101. As shown, the OPB 450 includes, for example, four entries each including a directory field 451 and an array field 453. The directory field 451 contains two addresses: the address of the prefetched line and the address of the instruction that caused the prefetch. Recall, a prefetch request is generated when an instruction fetch block matches an instruction address that caused a previous operand miss that is saved in the directory or the OPT 80. Both the prefetch line address and instruction address are sent to the cache 101 for processing as described above with respect to FIG. 7. The array field 453 stores the line of the memory 103 prefetched into the OPB 450. For example, if the memory line size is 128 bytes, then the array field 453 of each entry preferably holds 128 bytes of information.

Each entry may also include a status bit 455 and a valid bit 456, as shown. The status bit 455 indicates if the prefetch line stored in the array field 453 has been used by the execution units of the processor. Note, prefetches are speculative fetches made by the prefetch mechanism in advance of any actual use by the execution units of the processor. Preferably, the status bit 455 of each entry is initially set to zero when the prefetch corresponding to the entry is initiated, and then set to one if the corresponding prefetch is utilized by the execution units of the processor. Importantly, the status bit 455 is used to update the confirmation bit of the corresponding entry in the OPT 80 when it is discovered that prefetched lines have not been utilized by execution units of the processor. As is conventional, the valid bit 456 when set indicates that the entry contains valid information.

The OPB 450 may also include an LRU field 457 that records the age of each line stored in array field 453 of the entries of the OPB 450. The LRU field 457 is used to select a line for replacement when a new prefetch is attempted and all entries in the OPB 450 are currently occupied. Preferably, the LRU field 457 identifies the entry holding the least-recently-used line, which is therefore the best candidate for replacement. Note, there is only a single LRU field for the OPB 450. Moreover, the LRU field 457 can be eliminated if the OPB includes a single entry. In this case, each new prefetch will overwrite the existing prefetch currently held in the OPB 450.

FIG. 10 illustrates the operation of the cache 101 with an OPB 450 responding to a cache request. The figure shows much of the logic shown in FIG. 8 but adds function necessary to examine the OPB 450. The cache request 401 may be divided into a high order portion 402 and low order portion 403, as before. The high order portion 402 is sent, preferably simultaneously, to compare logic 510 and compare logic 511. Compare logic 510 takes the high order portion of the cache request and compares it to the line addresses held in the directory portion 420 of the cache 101. Similarly, compare logic 511 compares the high order portion 402 of the cache request to the line addresses held in the directory fields 451 of the entries of the OPB 450. If compare logic 510 determines that a matching entry exists in the cache 101 (i.e., a cache "hit"), then cache-directory gate 52 signals cache/OPB hit-select logic 435 to forward the requested information saved in the data portion 430 of the matching entry to the requesting processing element. The cache/OPB hit-select logic 435 uses the low order portion 403 of the cache address to select the requested bytes (or word) within the selected line saved in the cache. If compare logic 510 determines that a matching entry does not exist in the cache 101 (i.e., a cache "miss"), then the results output from the compare logic 511 are checked. If the compare logic 511 determines that a matching entry exists in the OPB 450 (i.e., an OPB "hit"), four actions occur in parallel. First, gate 54 forwards the line of data stored in the array portion 453 of the matching entry to the cache/OPB hit-select logic 435 where it is forwarded to the requesting processing element. Here the cache/OPB hit-select logic 435 uses the low order portion 403 of the cache address to select the requested bytes (or word) within the selected line saved in the OPB. Second, gate 56 recognizes the cache miss and OPB hit, signals select logic 425 to choose a cache line for replacement, and then transfers the line from the OPB 450 to the cache 101. Third, the valid bit corresponding to the selected entry in the OPB is cleared indicating that the corresponding entry is empty and that the line has been transferred from the OPB 450 to the cache 101. Fourth, the status bit corresponding to the selected entry in the OPB is set to one. By this action, the prefetched line is noted as a successful prefetch (i.e., the prefetch has been utilized by the execution units of the processor).

If a matching entry does not exist in both the cache 101 and the OPB 450 (i.e., a cache/OPB miss), gate 58 recognitions the cache/OPB miss condition and requests the line from the memory 103. Again, the replacement algorithm of the cache 101 identifies an existing line in the cache 101 to be overwritten when the miss returns. When the line returns from memory 103, it is written into the cache 101 into the line identified by the replacement algorithm of the cache 101. If the miss is the result of a store-data request, then logic 436 will replace the portion of the line that returns from the memory with the store information 404 that caused the cache miss.

According to the present invention, the instruction address 405 is also supplied to the cache 101 with each operand request. Note both the operand address and the instruction address are sent to the cache 101 by the address-generate-mechanism 111. When compare logic 510 determines that a matching entry does not exist in the cache 101 (i.e., a cache miss has occurred), then the miss address and the instruction address causing the miss are sent to the cache-miss-update logic 210 of FIG. 4. Gate 59 detects the miss condition output from compare logic 510 and sends the miss address and instruction address to the cache-miss-update logic 210 via path 99. The cache-miss-update logic 210 then uses this information to create new OPT entries or verify that existing OPT entries are generating useful prefetches.

Figures 11, 11A:
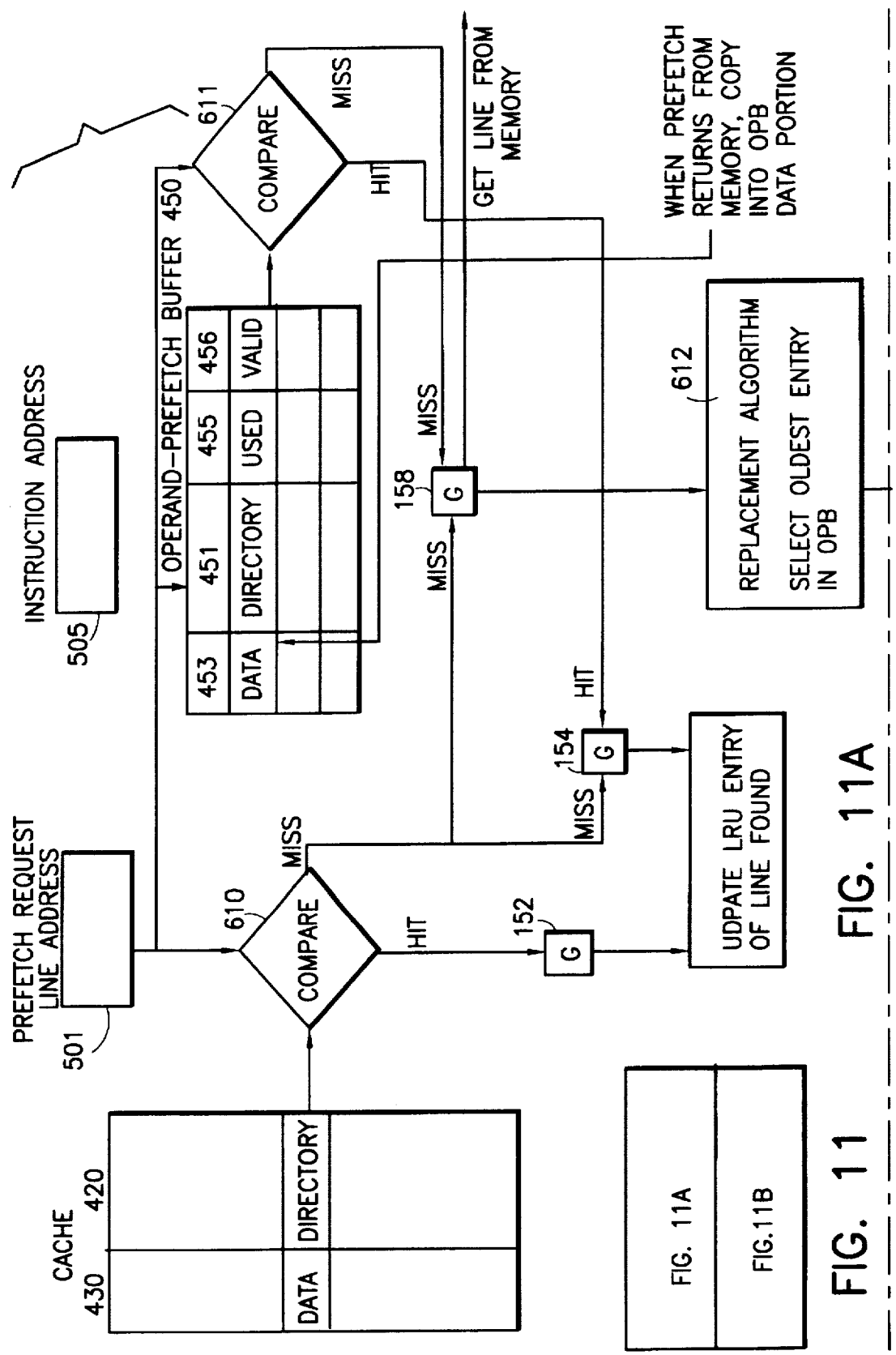
FIG. 11 is a functional block diagram of a cache including the OPB of FIG. 10 in processing a prefetch request according to the present invention.
Figure 11B:
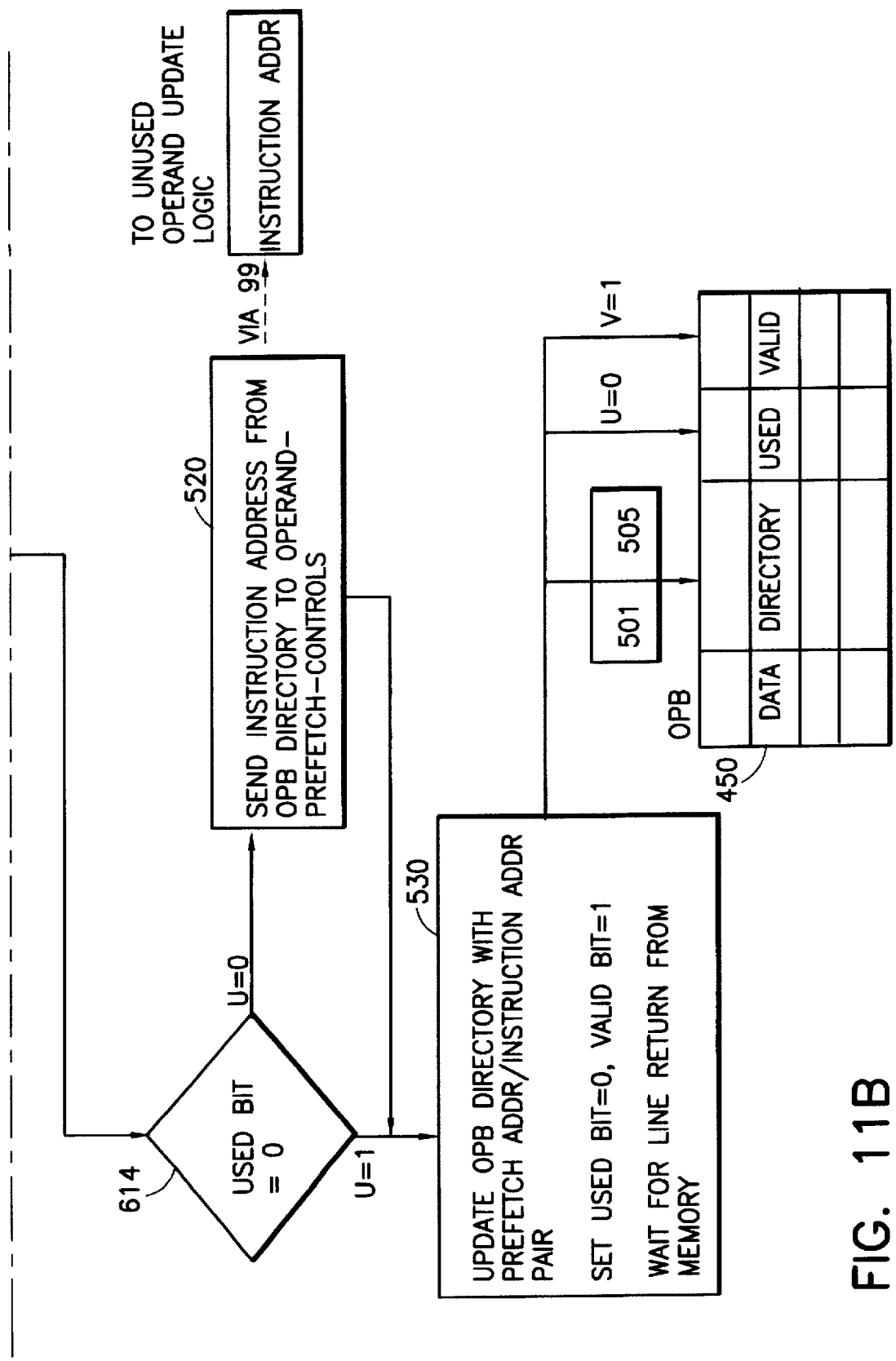

A general description of the cache 101 has been presented. Prefetch buffers were added to the cache design to accommodate prefetching. Next, with reference to FIG. 11, a description of the cache 101 responding to a prefetch request is presented. Recall that the operand prefetch line address along with the instruction address that generated the prefetch are supplied to the cache 101 by prefetch address construct logic 316 and instruction address construct logic 314, respectively, as discussed above with respect to FIG. 7. The operand prefetch line address 501 is sent to compare logic 610 and compare logic 611. Compare logic 610 compares the operand prefetch line address 501 to the line addresses held in the directory portion 420 of the cache 101. Similarly, compare logic 611 compares the operand prefetch line address to the line addresses held in the directory fields 451 of the entries of the OPB 450. If compare logic 610 determines that a matching entry exists in the cache (i.e. a cache "hit"), gate 152 updates the LRU fields within the cache 101 to identify the corresponding cache line as the most-recently-used line, thus updating the line replacement algorithm for the cache 101. By this action, the identified line is given the longest possible time to remain in the cache 101 until it has been used. Then, the prefetch request is discarded. Note, no other action by the cache 101 is needed. If the prefetch address is not in the cache but the compare logic 611 determines that a matching entry exists in the OPB 450 (i.e. an OPB "hit"), then gate 154 updates the LRU field 457 of the OPB 450 to identify the corresponding entry as the most-recently-used entry, thus updating the line replacement algorithm for the OPB 450. By this action, the identified entry is given the longest possible time to remain in the OPB 450 until it has been used. Then, the prefetch request is discarded. Note, no other action by the OPB 450 is needed.

If both compare logic 610 and compare logic 611 determine that matching entries do not exist in the cache 101 and OPB 450 (i.e., a cache/OPB "miss"), gate 158 detects this condition, fetches the requested line of data from the memory 103, and upon receipt places the data into the OPB 450. Note that data returned from the memory 103 that corresponds to prefetch request that missed both the cache 101 and OPB 450 is placed in the prefetch buffers. However, data returned from the memory 103 that corresponds to a normal cache request that missed both the cache 101 and OPB 450 (i.e., a demand miss) is placed in the cache 101.

Upon detecting the cache/OPB condition, gate 158 also signals the replacement algorithm 612 utilized by the OPB 450 to select a line for replacement. The replacement algorithm 612 identifies the oldest entry in the OPB 450 for replacement. Note, the oldest entry is identified by using the LRU field 457 found in the OPB 450. Compare logic 614 then checks whether the status bit 455 of the entry identified by the replacement algorithm 612 is set to zero, signifying that the entry was unused by the execution elements of processor. If the compare logic 614 determines the status bit 455 of the entry is zero, then the instruction address stored in the selected directory portion of the identified entry of the OPB is sent to the unused-operand-update logic 215 of the OPC logic 125 in order to update the confirmation bit of the sub-entry of the OPT 80. The unused-operand-update logic 215 identifies the sub-entry corresponding to the instruction that caused the prefetch and sets the confirmation bit of the sub-entry to zero. This action will then prohibit future prefetches from occurring for this sub-entry until it is established that it is a valid predictor of future cache misses.

It is noted that the replacement algorithm used by the OPB 450 is a least-recently used (LRU) type replacement algorithm; however, this does not suggest that alternative replacement algorithms or variations of the LRU described above are less effective. For example, the replacement algorithm may first search the directory fields of the entries of the OPB 450 to identify if any line has been used and marked invalid, indicated by its used bit 455 being set to one and the valid bit set to zero. If such an entry is found, it would have already been transferred to the cache 101. The replacement algorithm may then identify this line as the line to be replaced regardless of the current LRU settings. Such a scheme extends the amount of time that an unused line can remain in the OPB 450 and thus increase the probability that it will be used by the execution units of processor in the future.

Finally, regardless of the value of the status bit of the particular OPB entry identified by the line replacement algorithm 612, the particular OPB entry is updated to identify the new prefetch request. Preferably, the operand prefetch line address 501 and the instruction address 505 are placed in the directory portion of the particular OPB entry, the valid bit of the particular OPB entry is set to one, and the status bit of the particular OPB entry is initially set to zero. When it can be verified that the prefetched line will be used by the execution elements of the processor, through a normal cache request, will the status bit be set to one. As described above, when the prefetched line returns from the memory 103, the data will be placed in the array portion 453 of the particular entry of the OPB 450 selected by the replacement algorithm.

Figure 12:
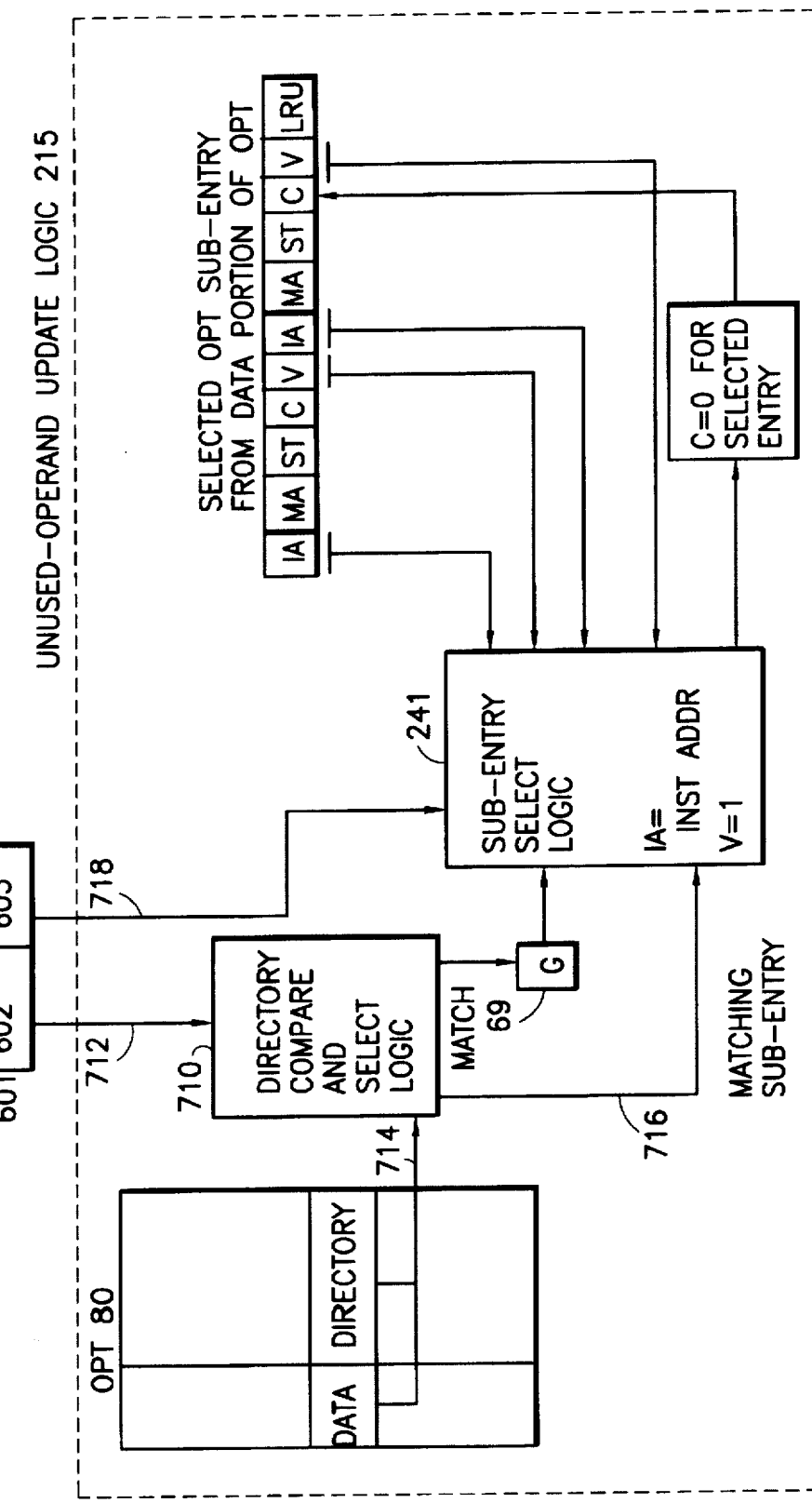
FIG. 12 is a functional block diagram of the OPT unused operand update logic of the OPC logic of FIG. 4 according to the present invention.

FIG. 12 illustrates operation of the unused-operand-update logic 215 of the OPC logic 125 in updating the confirmation bit of sub-entries stored in the OPT 80 when a prefetch request was made but not used by the execution elements of the processor. More specifically, the instruction address 601 corresponding to the prefetch request that was made but not used is supplied to the unused-operand-update logic 215 and divided into two parts: a high order portion 602 and low order portion 603. The high order portion 602 is supplied to compare logic 710 via path 712. Directory compare and select logic 710 then searches the directory portions of the entries of the OPT 80 to identify if any entry of the OPT 80 contains the instruction that caused the unused prefetch. The directory portion and corresponding sub-entry information of the entries of the OPT 80 are sent to the directory compare and select logic 710 via path 714.

If directory compare and select logic 710 determines that such an entry exist, this condition is detected by gate 69 which signals sub-entry select logic 241 to identify if a sub-entry of the matching entry corresponds to the unused fetch request. The corresponding matching entry is sent from the directory compare and select logic 710 to the sub-entry select logic 241 via path 716. Sub-entry select logic 241 identifies the corresponding sub-entry by comparing the low order portion 603 of the instruction address 603 sent via path 718 to the instruction address IA fields of the selected sub-entries whose corresponding valid bit set to one. If a matching sub-entry is found, then the confirmation bit of the sub-entry is set to zero, thus inhibiting future prefetches for that sub-entry until it is verified that the sub-entry can accurately generate future operand misses curs, then a prefetch can be attempted.

Advantageously, the method and apparatus of the present invention saves the address of each instruction fetch block that contained an instruction that caused an operand miss, thus allowing a prefetch to be attempted for the operands of an instruction even before the instruction itself has been fetched from memory. Moreover, by associating the miss address and stride information in the OPT, prefetches can be attempted for operands that have not been missed in the past. Also, the OPT saves the addresses of previously made instruction fetch blocks in a relatively small table, yet avoiding many of the cache misses associated with a relatively large cache. By providing an OPT of relatively small size in comparison to the cache, and using it to select candidates for prefetching, the probability of future cache hits is increased without increasing the cache size.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a data processing system wherein sequences of instructions stored in a main memory are executed by at least one processor, a method of transferring from said main memory to a high speed buffer operand data utilized by said processor when executing one or more of said sequences of instructions, the method comprising the steps of:

storing operand miss addresses in entries of a table, wherein each entry of said table includes an operand miss address that identifies an operand miss and an instruction address field that identifies an instruction that caused said operand miss identified by said operand miss address of said entry, fetching at least one instruction from said main memory to said high speed buffer according to a fetch control signal; and prefetching operand data identified by an operand miss address stored in at least one entry of said table from said main memory to said high speed buffer when said fetch control signal corresponds to an instruction address field of said at least one entry.

2. The method of claim 1, wherein each entry of said table includes a confirmation bit corresponding to said operand miss address of said entry, and wherein first operand data identified by an operand miss address stored in a first entry of said table is prefetched from said main memory to said high speed buffer when i) said fetch control signal corresponds to said instruction address field of said first entry, and ii) said confirmation bit of said first entry is set to a first predetermined value thereby indicating that said first operand data should be prefetched from said main memory to said high speed buffer.

3. The method of claim 2, wherein each entry further comprises a stride field that identifies offset from a subsequent operand miss to a next operand miss for said instruction identified by said instruction address field of said entry, further comprising the steps of:

identifying a cache miss address;

identifying a particular entry whose instruction address field corresponds to said cache miss address; and if said confirmation bit of said particular entry is set to said first predetermined value and sum of said operand miss address and said stride field of said particular entry does not equal said cache miss address, setting said confirmation bit to a second predetermined value thereby indicating that operand data corresponding to said operand miss address of said particular entry should not be prefetched from said main memory to said high speed buffer, updating said stride field of said particular entry to difference between said operand miss address of said entry and said cache miss address, and updating said operand miss address of said particular entry to said cache miss address.

4. The method of claim 2, wherein each entry further comprises a stride field that identifies offset from a subsequent operand miss to a next operand miss for said instruction identified by said instruction address field of said entry, further comprising the steps of:

identifying a cache miss address;

identifying a particular entry whose instruction address field corresponds to said cache miss address; and if said confirmation bit of said particular entry is set to said first predetermined value and sum of said operand miss address and said stride field of said particular entry equals said cache miss address, updating said operand miss address of said particular entry to said cache miss address.

5. The method of claim 2, wherein each entry further comprises a stride field that identifies offset from a subsequent operand miss to a next operand miss for said instruction identified by said instruction address field of said entry, further comprising the steps of:

identifying a cache miss address;

identifying a particular entry whose instruction address field corresponds to said cache miss address; and if said confirmation bit of said particular entry is set to a second predetermined value thereby indicating that operand data corresponding to said operand miss address of said particular entry should not be prefetched from said main memory to said high speed buffer and sum of said operand miss address and said stride field of said particular entry does not equal said cache miss address, updating said stride field of said particular entry to difference between said operand miss address of said entry and said cache miss address, and updating said operand miss address of said particular entry to said cache miss address.

6. The method of claim 2, wherein each entry further comprises a stride field that identifies offset from a subsequent operand miss to a next operand miss for said instruction identified by said instruction address field of said entry, further comprising the step of:

identifying a cache miss address;

identifying a particular entry whose instruction address field corresponds to said cache miss address; and if said confirmation bit of said particular entry is set to a second predetermined value thereby indicating that operand data corresponding to said operand miss address of said particular entry should not be prefetched from said main memory to said high speed buffer and sum of said operand miss address and said stride field of said particular entry equals said cache miss address, setting said confirmation bit of said particular entry to said first predetermined value.

7. The method of claim 2, further comprising the step of updating said confirmation bit of a particular entry upon determining that a prefetch request corresponding to said entry was made but not utilized by said processor.

8. The method of claim 1, wherein said fetch control signal is an address within said main memory of an instruction fetch block that comprises said at least one instruction.

9. The method of claim 1, wherein said high speed buffer includes a data cache integral with an instruction cache.

10. The method of claim 1, wherein said high speed buffer includes a data cache separate from an instruction cache.

11. The method of claim 1, wherein said high speed buffer includes a prefetch buffer separate from said data cache.

12. A data processing system comprising:

a main memory that stores sequences of instructions to be executed by at least one processor;

a high speed buffer that stores operand data utilized by said processor when executing one or more of said sequences of instructions;

instruction fetch logic that fetches at least one instruction from said main memory to said high speed buffer according to a fetch control signal;

a table for storing entries each including an operand miss address that identifies an operand miss and an instruction address field that identifies an instruction that caused said operand miss identified by said operand miss address of said entry; and operand prefetch control means for prefetching operand data identified by an operand miss address stored in at least one entry of said table from said main memory to said high speed buffer when said fetch control signal corresponds to an instruction address field of said at least one entry.

13. The system of claim 12, wherein each entry of said table includes a confirmation bit corresponding to said operand miss address of said entry, and wherein said operand prefetch control means prefetches first operand data identified by an operand address stored in a first entry of said table from said main memory to said high speed buffer when i) said fetch control signal corresponds to said instruction address field of said first entry, and ii) said confirmation bit of said first entry is set to a first predetermined value thereby indicating that said first operand data should be prefetched from said main memory to said high speed buffer.

14. The system of claim 12, wherein each entry further comprises a stride field that identifies offset from a subsequent operand miss to a next operand miss for said instruction identified by said instruction address field of said entry, said system further comprising means for identifying a cache miss address; and wherein said operand prefetch control means identifies a particular entry whose instruction address field corresponds to said cache miss address, and if said confirmation bit of said particular entry is set to said first predetermined value and sum of said operand miss address and said stride field of said particular entry does not equal said cache miss address, sets said confirmation bit of said particular entry to a second predetermined value thereby indicating that operand data corresponding to said operand miss address of said particular entry should not be prefetched from said main memory to said high speed buffer, updates said stride field of said particular entry to difference between said operand miss address of said entry and said cache miss address, and updates said operand miss address of said particular entry to said cache miss address.

15. The system of claim 12, wherein each entry further comprises a stride field that identifies offset from a subsequent operand miss to a next operand miss for said instruction identified by said instruction address field of said entry, said system further comprising means for identifying a cache miss address; and wherein said operand prefetch control means identifies a particular entry whose instruction address field corresponds to said cache miss address, and if said confirmation bit of said particular entry is set to said first predetermined value and sum of said operand miss address and said stride field of said particular entry equals said cache miss address, updates said operand miss address of said particular entry to said cache miss address.

16. The system of claim 12, wherein each entry further comprises a stride field that identifies offset from a subsequent operand miss to a next operand miss for said instruction identified by said instruction address field of said entry, said system further comprising means for identifying a cache miss address; and wherein said operand prefetch control means identifies a particular entry whose instruction address field corresponds to said cache miss address, and if said confirmation bit of said particular entry is set to second predetermined value thereby indicating that operand data corresponding to said operand miss address of said particular entry should not be prefetched from said main memory to said high speed buffer and sum of said operand miss address and said stride field of said particular entry does not equal said cache miss address, updates said stride field of said particular entry to difference between said operand miss address of said entry and said cache miss address, and updates said operand miss address of said particular entry to said cache miss address.

17. The system of claim 12, wherein each entry further comprises a stride field that identifies offset from a subsequent operand miss to a next operand miss for said instruction identified by said instruction address field of said entry, said system further comprising means for identifying a cache miss address; and wherein said operand prefetch control means identifies a particular entry whose instruction address field corresponds to said cache miss address, and if said confirmation bit of said particular entry is set to a second predetermined value thereby indicating that operand data corresponding to said operand miss address of said particular entry should not be prefetched from said main memory to said high speed buffer and sum of said operand miss address and said stride field of said particular entry equals said cache miss address, sets said confirmation bit of said particular entry to said first predetermined value.

18. The system of claim 12, wherein said operand prefetch control means updates said confirmation bit of a particular entry upon determining that a prefetch request corresponding to said entry was made but not utilized by said processor.

19. The system of claim 12, wherein said fetch control signal is an address within said main memory of an instruction fetch block that comprises said at least one instruction.

20. The system of claim 12, wherein said high speed buffer includes a data cache integral with an instruction cache.

21. The system of claim 12, wherein said high speed buffer includes a data cache separate from an instruction cache.

22. The system of claim 12, wherein said high speed buffer includes a prefetch buffer separate from said data cache.

* * * * *